(12) United States Patent
Rivere

(10) Patent No.: US 8,971,853 B2
(45) Date of Patent: Mar. 3, 2015

(54) METHOD AND SYSTEM TO RECORD AND VISUALIZE TYPE, TIME AND DURATION OF MOVING AND IDLE SEGMENTS

(71) Applicant: MobiWork, LLC, Delray Beach, FL (US)

(72) Inventor: Herve Rivere, Delray Beach, FL (US)

(73) Assignee: MobiWork, LLC, Delray Beach, FL (US)

( * ) Notice: Subject to any disclaimer, the term of this patent is extended or adjusted under 35 U.S.C. 154(b) by 89 days.

(21) Appl. No.: 13/649,714

(22) Filed: Oct. 11, 2012

(65) Prior Publication Data

US 2013/0090089 A1   Apr. 11, 2013

Related U.S. Application Data

(60) Provisional application No. 61/545,930, filed on Oct. 11, 2011, provisional application No. 61/545,957, filed on Oct. 11, 2011.

(51) Int. Cl.
| | | |
|---|---|---|
| *H04M 1/66* | (2006.01) | |
| *H04M 1/68* | (2006.01) | |
| *H04M 3/16* | (2006.01) | |
| *H04W 12/02* | (2009.01) | |

(52) U.S. Cl.
CPC .................................... *H04W 12/02* (2013.01)
USPC ......................................................... 455/411

(58) Field of Classification Search
CPC ..... H04W 12/06; H04W 12/08; H04W 12/02; H04W 8/18; H04W 4/02; H04W 8/183; H04W 48/16; H04W 4/001; H04W 8/02; H04W 4/003; H04W 8/205; H04W 24/08; H04W 36/0055; H04W 48/04; H04W 4/025
See application file for complete search history.

(56) References Cited

U.S. PATENT DOCUMENTS

| | | |
|---|---|---|
| 4,009,375 A | 2/1977 | White et al. |
| 4,891,650 A | 1/1990 | Sheffer |
| 5,182,705 A | 1/1993 | Barr et al. |
| 5,458,123 A | 10/1995 | Unger |
| 5,552,772 A | 9/1996 | Janky et al. |
| 5,561,706 A | 10/1996 | Fenner |
| 5,652,570 A | 7/1997 | Lepkofker |
| 5,712,899 A | 1/1998 | Pace, II |
| 5,734,706 A | 3/1998 | Windsor et al. |
| 5,734,837 A | 3/1998 | Flores et al. |
| 5,754,857 A | 5/1998 | Gadol |
| 5,936,572 A | 8/1999 | Loomis et al. |

(Continued)

*Primary Examiner* — Liton Miah
(74) *Attorney, Agent, or Firm* — Robert C. Kain, Jr.

(57) ABSTRACT

GPS signal data is converted into movement and idle indicators and is classified as a task-related or privacy event. The task data database lists personnel, location-situs, projected time-of-arrival, time-on-site and other task data. When GPS-location matches task situs, time-on-site data is generated. A movement-ON notes end-of-task. The method gathers pre-set privacy event data from the task person or the task person can, in real time, set ON a privacy block. In real time, the privacy block masks the idle ON and movement ON status until an end-of-privacy time. The method classifies, in real time, idle ON, movement ON and publishes this data on a daily calendar beyond any privacy block. The method also accepts a privacy block re-classification. In real time, status postings note traffic delays, vendor assistance, equipment needed, and co-worker needed indicator. An accounting recovery code can be assigned to the status indicators for billing and accounting purposes.

8 Claims, 19 Drawing Sheets

(56) References Cited

U.S. PATENT DOCUMENTS

| | | |
|---|---|---|
| 6,098,048 A | 8/2000 | Dashefsky et al. |
| 6,154,727 A | 11/2000 | Karp et al. |
| 6,202,023 B1 | 3/2001 | Hancock et al. |
| 6,295,513 B1 | 9/2001 | Thackston |
| 6,415,284 B1 | 7/2002 | D'Souza et al. |
| 6,509,830 B1 | 1/2003 | Elliott |
| 6,553,407 B1 | 4/2003 | Ouchi |
| 6,615,184 B1 | 9/2003 | Hicks |
| 6,687,609 B2 | 2/2004 | Hsiao et al. |
| 6,731,238 B2 | 5/2004 | Johnson |
| 7,051,273 B1 | 5/2006 | Holt et al. |
| 7,102,510 B2 | 9/2006 | Boling et al. |
| 7,136,747 B2* | 11/2006 | Raney ............................ 701/465 |
| 7,142,892 B2 | 11/2006 | Dennis et al. |
| 7,155,519 B2 | 12/2006 | Lo et al. |
| 7,206,568 B2 | 4/2007 | Sudit |
| 7,246,746 B2 | 7/2007 | McNamara et al. |
| 7,249,045 B2 | 7/2007 | Lauffer |
| 7,372,365 B2 | 5/2008 | Jackson |
| 7,688,185 B1 | 3/2010 | McKethan |
| 7,756,293 B2 | 7/2010 | Kuwabara et al. |
| 8,548,734 B2* | 10/2013 | Barbeau et al. .............. 701/411 |
| 2002/0082771 A1* | 6/2002 | Anderson ...................... 701/209 |
| 2003/0046158 A1* | 3/2003 | Kratky .............................. 705/14 |
| 2004/0267595 A1 | 12/2004 | Woodings et al. |
| 2005/0021428 A1 | 1/2005 | Costello |
| 2005/0202830 A1 | 9/2005 | Sudit |
| 2005/0202831 A1 | 9/2005 | Sudit |
| 2005/0202832 A1 | 9/2005 | Sudit |
| 2005/0202834 A1 | 9/2005 | Sudit |
| 2006/0047548 A1 | 3/2006 | Ulmer et al. |
| 2006/0055536 A1* | 3/2006 | Jackson .................... 340/572.1 |
| 2006/0126620 A1 | 6/2006 | Bonar et al. |
| 2006/0206370 A1 | 9/2006 | Skopal |
| 2006/0258370 A1 | 11/2006 | Sudit et al. |
| 2007/0060171 A1 | 3/2007 | Sudit et al. |
| 2007/0162537 A1 | 7/2007 | Juncker |
| 2007/0264974 A1* | 11/2007 | Frank et al. .................... 455/411 |
| 2007/0282479 A1 | 12/2007 | Shibuya et al. |
| 2007/0282722 A1 | 12/2007 | Ducolon et al. |
| 2008/0014964 A1 | 1/2008 | Sudit et al. |
| 2008/0052346 A1 | 2/2008 | Bassat et al. |
| 2008/0091498 A1 | 4/2008 | Chiverton et al. |
| 2008/0171559 A1* | 7/2008 | Frank et al. .................. 455/456.5 |
| 2010/0076898 A1 | 3/2010 | Beshears et al. |
| 2012/0203589 A1 | 8/2012 | Eggena et al. |

* cited by examiner

FIG. 2A

Activities Today

| Title | User | Time | Work Order (WO) - Task | Customer | Action |
|---|---|---|---|---|---|
|  |  |  |  |  |  |
|  |  |  |  |  |  |

FIG. 2B

Customers

| Name | Address | Primary Contact | Actions |
|---|---|---|---|
|  |  |  |  |
|  |  |  |  |

FIG. 2C

Work Orders

| File Type | Customer | Location | Status | Date-Time | Assigned to Task Person | Confirm | Action |
|---|---|---|---|---|---|---|---|
|  |  |  |  |  |  |  |  |
|  |  |  |  |  |  |  |  |

FIG. 2D

Equipment

| Type | Ser. No. | Work Order | Customer Name | Action |
|---|---|---|---|---|
|  |  |  |  |  |
|  |  |  |  |  |

FIG. 2E

Work Order Reports

| Customer | |
|---|---|
| Equipment Ser. No. | |
| Creation Date From | |
| Creation Date to | |
| Report Format | fnc. Sel.: Excel, QuatroPro, Word |
| Create Report | fnc: YES |

FIG. 2F

Balance Sheet

| Customer | |
|---|---|
| fnc: create report | YES |

FIG. 2G

Tasks

| File type | ID | Status | Category | Description | Date | Action | Status |
|---|---|---|---|---|---|---|---|
| | | | | | | | |
| | | | | | | | |

FIG. 2H

Users

| Login ID | Name | Status | Action |
|---|---|---|---|
| | | | |
| | | | |

FIG. 2I

Partners

| Name | Co. Name | Ph No. | Email | Status | Action |
|------|----------|--------|-------|--------|--------|
|      |          |        |       |        |        |
|      |          |        |       |        |        |

FIG. 2J

Devices

| Make | Model | User Name | Last Update time | Action |
|------|-------|-----------|------------------|--------|
|      |       |           |                  |        |
|      |       |           |                  |        |

FIG. 2K

Products

| Id | Name | SKU# | Price | Quantity | Actions |
|----|------|------|-------|----------|---------|
|    |      |      |       |          |         |
|    |      |      |       |          |         |

FIG. 3A

Configured Table - Initial Screen (includes new notifications, new WOs, Wos)

New Notifications

| Type | ID | Date | Description | fnc: View (V) | fnc: Accept (ACC) | fnc: delete (DEL) |
|---|---|---|---|---|---|---|
| alarm | 123 | 10.10.2011 | low batty | user select | u-sel | u-sel |
| alarm | 564 | 10.10.2011 | confirm telecom | u-sel | u-sel | u-sel |
| | | | | | | |

New/Unassigned Work Orders ("WO")

| ID/Title | Customer/Loc | Status | Date | Action |
|---|---|---|---|---|
| 34 (WO 034) | John Bee 900 S. Terrace Miami, FL 123A | open | 10.15.2011 | fnc: V, ACC, DEL |
| more | etc | etc | | |
| | | | | X-Table Fnc: pg. 2, pg. 3, etc. |

Assigned Work Orders (no. WO's)

| ID/Title | Customer/Loc | Status | Date | Assigned to | Confirm | Action |
|---|---|---|---|---|---|---|
| 34 (WO 034) | John Bee 900 S. Terrace Miami, FL 123A | open | 10.15.2011 | Dean Smith, Ph: 345-3-260 | pending (Alt: YES, NO) | fnc: V, ACC, DEL |
| more | etc | etc | | | | |
| | | | | | | XT-fnc: pg. 2, 3, 4 |

Activities Today

| Title | User | Time | WO/Task | Customer | Actions |
|---|---|---|---|---|---|
| | | | | | fnc: V, ACC, DEL |
| | | | | | XT-fnc: pg. 2, 3, 4 |

FIG. 3B

Configured Table - New Notifications

| Alarm 123 | | | |
|---|---|---|---|
| Message | data | Status | data (ack, pend, NO) |
| Acknowledge day | date data | Create date | data |
| Acknowledge who | person data | Close date | data |
| System alarm (criticality) | critical data type | Closed by who | person data |

FIG. 3C

Configured Table - Assigned Work Orders (WO) - Main Menu

| Menu Fnc: | Summary | Equip | Notes | Docs | Forms | Activity | Bills | History |
|---|---|---|---|---|---|---|---|---|
| Status | Assigned: Y, N, pending | | | | Confirm Status | | pend, not assigned | |
| Created | date data | | | | | | Misc. Fnc: Input | |
| Customer | name | | addr. | | Ph. No. | | See More Data | |
| Location | data | | addr. | | Ph. No. | | Mark Critical | |
| Assigned to | person data | | email | | ph. No. | | Ack Done | |
| Appointment | appt. data | | travel time (est) | | time-on-site (est) | | Add Data Input | |
| Est. Duration | time span data | | travel time (actual) | | time-on-site (actual) | | | |

FIG. 3D

Configured Table - Assigned Work Orders (WO) - Equipment Table

| Menu Fnc: | Summary | Equip | Notes | Docs | Forms | Activity | Bills | History |
|---|---|---|---|---|---|---|---|---|
| Equipment Type | Problem Descript. | | Resolution | | Actions | | Fnc. | |
| Data | data | | data | | | | | |

FIG. 3E

Configured Table - Assigned Work Orders (WO) - Notes Table

| Menu Fnc: | Summary | Equip | Notes | Docs | Forms | Activity | Bills | History |
|---|---|---|---|---|---|---|---|---|
| Notes | | Date | | User-pull down list: Task Person, Mgr., Sys Op., etc. | | Visible by Customer | Actions | |
| data | | data | | | | YES/NO | Fnc. | |

FIG. 3F

Configured Table - Assigned Work Orders (WO) - DocumentTable

| Menu Fnc: | Summary | Equip | Notes | Docs | Forms | Activity | Bills | History |
|---|---|---|---|---|---|---|---|---|
| User List sel | Date | | Type | | Doc Name | Comment | Action - fnc. | |
| Data | data | | etc. | | | | | |

FIG. 3G

Configured Table - Assigned Work Orders (WO) - Form Table

| Menu Fnc: | Summary | Equip | Notes | Docs | Forms | Activity | Bills | History |
|---|---|---|---|---|---|---|---|---|

Data Processing Note: Convert Customer Form into Data Entry Forms

FIG. 3H

Configured Table - Assigned Work Orders (WO) - Activity Table

| Menu Fnc: | Summary | Equip | Notes | Docs | Forms | Activity | Bills | History |
|---|---|---|---|---|---|---|---|---|
| User | | Date | | Time | | Duration | Action | |
| | | | | | | | fnc. | |

FIG. 3I

Configured Table - Assigned Work Orders (WO) - Bills Table

| Menu Fnc: | Summary | Equip | Notes | Docs | Forms | Activity | Bills | History |
|---|---|---|---|---|---|---|---|---|
| Type | Name-descript | Price | Quantity | Rebate | Tax | | Total | Action: fnc. |
| Data | data | etc | | | | | | |
| | | | | | | | | |
| BALANCE | | | | | | | | |
| | | data | invoice no. | amt. bill | amt. Cr. | | Bal. | |

FIG. 3J

Configured Table - Assigned Work Orders (WO) - History Table

| Menu Fnc: | Summary | Equip | Notes | Docs | Forms | Activity | Bills | History |
|---|---|---|---|---|---|---|---|---|
| date/time | | Activity type | | | descript | | user | |
| data | | | | | | | | |

FIG. 3K

Configured Tables - Main Menu - Top Level Selections

| Main Menu Sel: | Home | Customers | Work Orders | Tasks | Activity | Account | Help |
|---|---|---|---|---|---|---|---|
| sub-menus | | | Work Orders | Tasks | Schedules | See below | |
| | | | Equip | Reports | Notifications (s-2d) | | |
| | | | Reports (sub-2d) | | Locations (s-2d) | | |
| | | | | | Reports (s-2d) | | |

Account Sub menus: Users, Partners, Devices, Products, Settings, My Settings, Admin
Reports Sub-2d ("s-2d"): Work Orders; Balance Sheet
Notification Sub-2d: Notifications, Messages, Alarms
Locations Sub-2d: Last Known, Task Person Time Sheet; Task Person Geo Path
Reports Sub-2d: Activity Report

FIG. 3L
Configured Tables - Activity - Schedule

Fnc: Daily Sel.; Monthly Sel; etc.
    Fnc.: Select User
    Fnc.: Select all users by group
    Fnc.: Select User y Smart Phone Device
    Fnc.: sel. geo. device or group geo. device Display Daily Calendar as per user selection (U-sel)
| Time Block | Person A | Person B | Person C |
|---|---|---|---|
| 8:00AM1 | xx | xx | xx |
| 8:30AM | | | |
| 9:00AM | | xx | xx |
| etc. | | | |

FIG. 3M

Configured Tables - Activity - Notifications

Fnc:   Daily Sel.; Monthly Sel; etc.
      Fnc.: Select User
      Fnc.: Select all users by group
      Fnc.: Select User by Smart Phone Device
      Fnc.: sel. geo. device or group geo. device Display Daily Calendar

| Time Block | Person A | Person B | Person C |
|---|---|---|---|
| 8:00AM | | | |
| 8:30AM | xx | | |
| 9:00AM | | | xx |
| etc. | | | |

FIG. 3N

Configured Tables - Activity - Location - Last Known

Display Geo Map with Location Pointer ("Loc. Ptr.")
      Fnc.: Show all smart phones in group
      Fnc.: Select User with Smart Phone
      Fnc.: sel. geo. device or group of geo. devices DISPLAY GOOGLE MAP HERE with loc. Ptr(s).

FIG. 3O

Configured Tables - Activity - Location - Timesheet Tracker

Fnc: Daily Sel.; Monthly Sel; etc.
      Fnc.: Select User and user assigned devices
      Fnc.: Select all users by group
      Fnc.: Select Smart Phone Device or group or smart phones
      Fnc.: sel. geo. device or group geo. device Display Daily Calendar

| Time Block | Task Person A | Task Person Smart Phone | Task Person Comp. Tablet |
|---|---|---|---|
| 8:00AM | data | data | data |
| 8:30AM | | | xxx |
| 9:00 | ccc | ccc | |
| etc. | | | |

FIG. 3P

Configured Tables - Activity - Location - Geo Tracker

Display Geo Map with Location Pointer (:Loc. Ptr.")
    Fnc.: Show all smart phones in group
    Fnc.: Select User with Smart Phone
    Fnc.: Select all users in a group
    Fnc.: sel. geo. device or group of geo. devices DISPLAY GOOGLE MAP HERE with loc. ptr(s)

| Critical Marker/ Type | Status | Time - start time and time on site | Approx. - distance |
|---|---|---|---|
| data | idle, moving, out of range | data | data |
|  | Total | data | data |

FIG. 3Q

Configured Tables - Activity - Reports

Activity Id
User (select pull down menu)
Customer
From: day input or display "select calendar"
To: day input or display "select calendar"

FIG. 3R

Configured Tables - Account - All Submenus

Account Sub menu: Users, Partners, Devices, Settings, My Settings, Admin
Data processing note: Common configuration tables, customizable, extendable

| Task Person TP-A | TB-B | TP-C | Equip-A1 |
|---|---|---|---|
| 7:00 | | | |
| 30 | | | |
| 8 | (Mgr- not assigned) | | (not assigned) |
| 30 | | | |
| 9 sch: TP-A1 Geo.Loc. Task 30  A-1 | | | |
| 10 | | | |
| 30 | | | |
| 11 | | | |
| 30 | | | |
| 12 TP-A 30  Privacy Block | | | |
| 1 | | | |
| 30 | | | |

FIG.7B

METHOD AND SYSTEM TO RECORD AND VISUALIZE TYPE, TIME AND DURATION OF MOVING AND IDLE SEGMENTS

This a regular patent application based upon and claiming the benefit of provisional patent application Ser. No. 61/545,930 filed Oct. 11, 2011, and Ser. No. 61/545,957 filed Oct. 11, 2011, the contents of which are incorporated herein by reference thereto. This patent application also incorporates by reference the contents of U.S. patent application Ser. No. 13/649,753, entitled "A Method and System to Analyze Time Stamp Location Data to Produce Movement and Idle Segments" filed Oct. 11, 2012, and U.S. patent application Ser. No. 13/649,773, entitled "Time on Site and Point of Interest Tracker with Privacy Block" filed Oct. 11, 2012.

The present invention relates to a system, a method and a computer program to analyze time stamp location data or GPS signal data from a GPS-enabled cellular phone, tablet computer or other electronic device in order to produce movement and idle segments for the task person (user) utilizing the GPS signal data and transform the series of GPS signal data into time-on-site indicator data and record and visualize the type, beginning time, ending time and duration of each movement segment and idle segment from the set of time stamped location data.

BACKGROUND OF THE INVENTION

It is well known that service men and women and sales persons who visit customer locations throughout a wide geographic territory are oftentimes delayed in meeting appointment times. These appointment times are set, in advance to provide service, repair and goods to the customer at the customer location or site or to engage the customer in conversations and demonstrations in an effort to sell goods or services to the customer. With the advent of GPS-enabled electronic devices (cellular telephones, smart phones, tablet computers and other devices having GPS-enabled circuitry), it is easier for the person assigned to the task (the service man or salesman) to locate the customer. However, a problem still exists if a number of customers are scheduled for a single day or if the task person must visit other stores or locations to collect additional service personnel or equipment or supplies (vendor locations) in order to complete the task at the customer's location.

Databases and spreadsheets (a spreadsheet being a two dimensional database) have been developed to provide customer service and improve customer relations through the use of computer programs and computer systems. Notwithstanding these tools, business have experienced difficulty in monitoring mobile work forces and sales forces which need to visit the customer site to close a sale or repair equipment or provide other services at the customer's location. The present system and method seeks to solve problems associated with a mobile workforce.

Many systems have been implemented for determining a geographic location and other parameters, of a device associated with persons, things, or apparatus at a given time. Conventional systems are typically designed to report those raw locations as such without further analysis most notably as to what the actual movement segments are (moving, idle, etc.).

There is a need for a reliable and automated method to identify the corresponding movement segments. There is a further need to visualize the time and the duration of the individual movement segments (as well as visualizing the corresponding appointments/schedule/calendar).

OBJECTS OF THE INVENTION

It is an object of the present invention to provide a comprehensive mobile work force solution that improves work force capability, productivity and visibility as well as improve the quality of the customer experience.

The present system exploits the GPS features of a smart cellular telephone or a tablet computer with a web based platform which enables management and assigned task personnel to track, locate, capture data, and record events both automatically and manually to provide service to the business' customer.

It is another object of the present invention to provide an integrated platform for customers, work orders, tasks activities and parts and products inventory management and integrate smart phone features such as real time communication, location, navigation, audio information, image data, signature data and payment processing directly to the user's and customer's location.

It is a further object of to present invention to to analyze time stamp location data or GPS signal data from a GPS-enabled cellular, tablet computer or other electronic device in order to produce movement and idle segments for the task person (user) utilizing the GPS signal data.

It is another object of the present invention to transform the series of GPS signal data into time-on-site indicator data and record and visualize the type, beginning time, ending time and duration of each movement segment from the set of time stamped location data.

Other objectives and advantages of the present invention are discussed later herein.

BRIEF DESCRIPTION OF THE DRAWINGS

Further objects and advantages of the present invention can be found in the detailed description of the preferred embodiments when taken in conjunction with the accompanying drawings in which:

FIGS. 2A-2K diagrammatically illustrate tables with database fields or spreadsheet fields for one embodiment of the invention.

FIGS. 3A-3R diagrammatically illustrate configured tables for another implementation of the present invention.

FIG. 7B diagrammatically illustrates a example of a daily calendar prior to the acquisition of GPS location data for GPS-enabled personnel and equipment.

SUMMARY OF THE INVENTION

Figure 1:
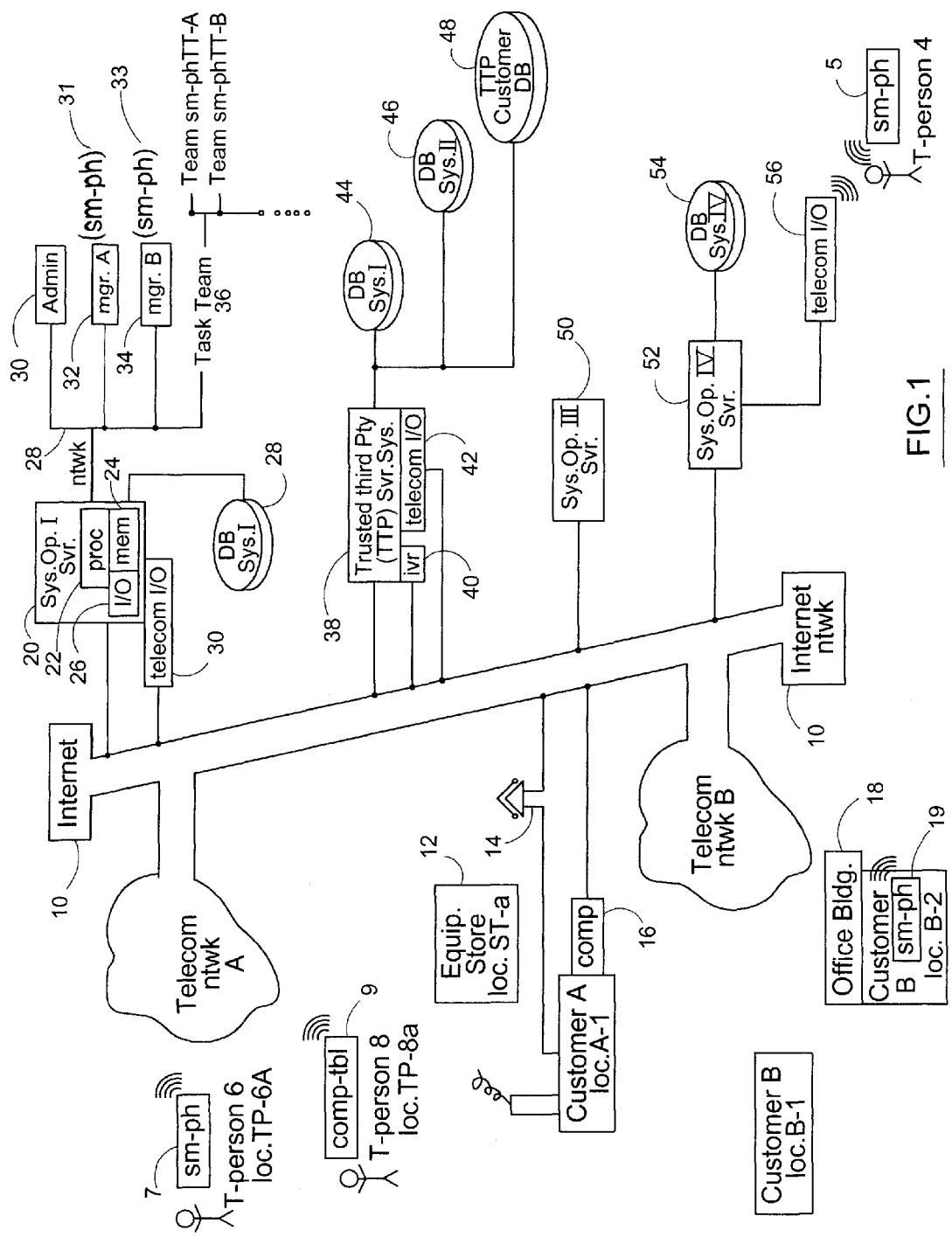
FIG. 1 diagrammatically illustrates a system diagram of the invention and various configurations of the method over a distributed computer system.

The computer-based method and system converts GPS signal data from a GPS-enabled device into motion indicator data and idle indicator data. This data is classified as a task-related event or a privacy event. A database is populated with a plurality of tasks represented by unique task data collections and task person data and each one of the unique task data collections has task situs location data, projected time of arrival data, time-on-site data, and task assignment data. The task person data represents at least contact data for that task person. The method and system periodically gathers GPS time stamped location data from the GPS-enabled device. The method determines when the GPS-enabled device is in an idle mode by monitoring distance between two positions. The method and system determines when the GPS-enabled device moves by comparing positions, velocity or a change in velocity.

The method then determines when the GPS-enabled device is in the idle mode and the present GPS location data substantially matches the task situs location. Time-on-site data is generated including start time, duration and end-of-task time. The end-of-task time determined when the idle ON status indicator changes and the movement ON status indicator is generated. The system and method also gathers privacy event data from the task person either prior to the step of periodically gathering GPS time stamped location data or prior to the step of determining the idle mode. The privacy event data includes at least a privacy start time. If pre-programmed, the privacy data includes a start and an end time.

The method then classifies in substantially real time, a privacy block over the idle ON status indicator and the movement ON status indicator when privacy event data is compiled with the status indicators. The method accepts an end-of-privacy time from the assigned task person as part of the privacy event data. The method also classifies, in substantially real time, idle indicator data when the idle ON status indicator is present and publishes the idle indicator data for the assigned task person upon command beyond the privacy block. The method further classifies, in substantially real time, motion indicator data when the movement ON status indicator is present and publishes the motion indicator data for the assigned task person upon command beyond the privacy block. Also, the method accepts a privacy block re-classification request from the assigned task person after the classification and publication of either of the idle indicator data and motion indicator data and reclassifies one or both of the idle indicator data and the motion indicator data as a privacy block.

As an enhancement, a managerial confirmation may be needed for reclassification. The task person during the communications session may set a status including: a traffic delay indicator; a vendor assistance indicator; an equipment needed indicator; and a co-worker needed indicator. The publication is presented in a time-segmented display. An accounting recovery code can be assigned to the status indicators for billing and accounting purposes.

DETAILED DESCRIPTION OF THE PREFERRED EMBODIMENTS

The present invention relates to a method and a system to analyze time stamp location data and to produce movement and idle data segments which are utilized to provide time on site indicator data and type, time and duration of moving segments. Similar numerals designate similar items throughout the patent specification. Some abbreviations in the drawings and the patent specification are identified in the Abbreviations Table at the end of the specification.

Basic System Description and Advantages

The system provides a comprehensive mobile workforce solution that improves workforce capability, productivity and visibility as well as the quality of the customer experience.

The system employs advanced software components, modules and data acquisition and processing methods which exploit the unique smartphone and computer tablet capabilities and a web-based platform enabling management and assigned task personnel to track, locate, capture data and record events both automatically and manually, thereby providing better service to the system operator's customers.

Customers, work orders, tasks, activities, parts/products and inventory management, forms, workflow automation, messaging and all the capabilities the smartphone brings (real-time communication, location, navigation, audio, image, signature, and payments) are seamlessly integrated into a series of user-friendly interfaces to empower the mobile workforce and provide a superior customer experience.

The system operator employs a web browser which is enabled at different levels of control for the front office, the back office, the assigned task person, task team members, management, and, to a limited extent to customers. These customizable interfaces provide real time results and time-and-location based planning and task execution. From the customer's view, he or she can now see the time-to-arrival and any impediments blocking the access to service, repair or sales call by viewing the customer portal.

The system uses smartphone capabilities (real-time communication, location, navigation, audio, image, signature, and payments)(also available from GPS enabled computer tablets and other GPS and telecom enabled devices) and integrates data from those devices with data from the front office, the back office, the task person, team members and management, and presents the same in an orderly fashion to the authorized party.

The system is suited for field services as well as other businesses that employ a fleet of mobile workers who execute activities outside of the office, such as sales, business development and customer service.

Application functionality and corresponding benefits are designed for mobile workers, managers, office coordinators and customers.

The GPS enabled cellphone, computer tablet or other electronic device with a telecom link is loaded with native applications that securely communicate over the Internet with the system operator servers, delivering inbound and outbound messages to track, exchange information and manage activities Office coordinators and management log in to web portals to create and update customer data, work orders, tasks, establish appointments, send notifications and access reports. The system is an extension of the system operator's customer relationship management (CRM) system and enterprise relationship program (ERP) enabling the system operator to extend its existing platform to the mobile world.

Customers are provided with access to a secure web portal to review appointments, create new orders and track workers on a time-based format and a geo location format. The system can be further integrated with interactive voice recognition (IVR) features to provide an audio phone based interface for customers.

The system improves workforce capability, productivity and visibility, which translates to cost and time savings, increased revenues and peace of mind. The system permits the system operator to configure a unique customer access portal to view a wide range of task person data (time to customer location, current location, estimated impediments, customer enabled input to add or alter customer contact data (home phone to cell phone to business phone). Accordingly, the customer is provided with more transparency and visibility, which results in a far superior customer experience and a competitive advantage.

Data acquisition and data processing modules are integrated together to provide a seamless and intuitive user interface at various control levels.

Customer Management Module (system operator ("Sys Op") controlled): Customers (including prospects), contacts, locations, custom forms, notes, history, appointments, customer relationship details such as previous work orders, documents, billing, invoices and payments, customizable processing rules, bulk provisioning, and reports.

Work Order Management Module: Drag and drop appointment scheduling, automated route planning (based on schedules, locations) and optimization, automated creation based on rules (service contracts), location based directions and navigation, notes, invoicing and payments, history, customer relationship details such as previous work orders, products/parts and inventory management, documents (audio, images), custom forms, signature capture, customizable processing rules, and reports.

Task Management Module: Drag and drop ordering, list management, expected completion dates and automated reminders, resource assignment, categories, access control, location based directions and navigation, documents (e.g. audio, images), customizable processing rules, and reports.

Activity Management Module: Drag and drop management of appointments, work orders and task scheduling, with real times updates to both office and mobile workers, automated time and travel tracking and billing with real location data (e.g. expense reports management), automated mobile worker location and movement tracking, time-on-site analysis, plan versus actual metrics for analysis and optimization.

Notifications (including emergencies and high risk situations) Module: Send/Receive alarms, messages, automated notifications reminders whenever attention is required. In case of an emergency, the task person—mobile worker can notify the Sys Op in two (2) clicks on the smart phone that the task person needs immediate and urgent help. In high risk working conditions, the automated watchdog mechanism immediately notifies the Sys Op if a mobile worker is not responding.

Account Management Module (web only designed for office): Extensive workflow automation framework (rules, filters, actions) to automatically exploit all the underlying information (e.g. automatically determining that a mobile worker is going to be late for an appointment), forms definition (including subforms and dynamic number of items), extensive set of customization parameters (including custom print views for forms, invoices and work orders), access control roles/permissions (template based as well as custom, individual and/or group of users), plus automated inventory.

The system and method is smartphone and GPS-enabled tablet based. There is no need for custom hardware to be installed on a vehicle, and no need for mobile workers to carry a costly, bulky and slow laptop.

The system is platform agnostic in that the system works on GPS-enables cell phone such as: BlackBerry™, Android™ (Apple, Microsoft on roadmap), and iPhone™ and iPad™.

The system is carrier agnostic and works on any telecom carrier (e.g. AT&T, Verizon, T-Mobile, Sprint, VodaFone).

The system is customizable by the Sys Op for any particular business or service. The system uses XML based APIs to interface with 3rd party software.

Smart Device Integration Features

The system and method exploits the software and hardware capabilities provided by the GPS-enabled smart electronic devices linked into the telecom system. The integrated features include: Navigation system including audio driving directions; Signature capture; Image capture; Audio capture; Video capture; Location capture; 1D and 2D (QR codes) bar codes capture; and Payment capture (including NFC when available)(near field communication payment systems).

Examples of these uses of the system are: (A) Delivery Service: Worker uses the system to view his next appointment, clicks on navigation for directions, arrives at the delivery point (location is tracked), scans a 2D code, captures customer signature. (B) Sales: Worker views list of customers/prospects to visit, upon arrival receives custom action checklist, allow customer to use QR code coupon, captures payment and signature. (C) Account Manager: Worker arrives at customer site, updates system database with latest info, adds audio trip report and photo, records video of customer testimonial.

The system and method provides Location Tracking and Movement Analysis.

Component Features such as (i) Advanced location tracking and reporting with multiple operating modes (continuous, business hours, points of interests) for privacy control and/or battery optimization. (ii) Automated movement intelligence including time on site and location-to-point-of-interest matching for idle segments. (iii) Privacy and access control framework to respect and guarantee the privacy of your employees. Integration with System rules engine to enable location & movement triggered actions.

Examples of these uses of the system are: (A) Mobile worker enters or leaves an area which triggers a 'geofencing' activity such as a billing timestamp, or an email alert to a customer when within 5 miles. (B) Mobile worker is leaving appointment, the system triggers a custom "System form" for worker to complete (e.g. appointment report). (C) Automatically track the amount of time spent at each customer by workers and deliver a report to management analyzing face time. (D) Automatically generate an alarm if a device/vehicle is moving at night, if an advertising truck is idle or outside the area it is supposed to be in. (E) Help to retrieve a lost device based on current or last known location.

The system and method provides Workflow Automation enabled to provide: (i) A rules based framework based on triggers, filters and actions to customize the Sys Op solution to its business needs. (ii) Wireless forms framework. (iii) Notifications and Reminders framework. (iv) Extensive customization support.

Workflow Automation functions include: (A) An "Office" alert and display configured to create a custom form to be displayed on the smart device every Friday at 2:00 PM (time and day trigger) to enable input of a weekly status report. (B) The system can display a form or checklist when a worker arrives at an appointment. (C) Set a rule for a coordinator/worker/manager to be notified by email or text whenever a mobile worker is going to be late for an appointment. (D)

Create a set of rules to detect abnormal conditions such as a vehicle moving at night or outside of a given area, or if a user is idle more than a certain amount of time (e.g. advertising truck).

The system and method provides Activity Scheduling, Tracking and Reporting to provide: (A) Drag and drop scheduling of appointments, work orders & task lists, with real times updates to workers. (B) Planned versus actual visualization and metrics, with the actual automatically created by this system component.

The system and method provides Mobile Planning by creating optimized route to save on fuel costs and limiting delays by finding the most efficient path in terms of mileage and traffic conditions.

The system and method provides privacy and access control framework for the task person.

A mobile worker's (task person's) schedule is updated during the day with a new and an optimized plan of activities, thereby eliminating paper plans and permitting the Sys Op to reduce paper and ink usage and achieve environmental goals.

The system and method provides Activity and Expense reports which can be validated by system audit trails. For example, a manager can receive a report every morning with activity details for entire mobile team: % late, % on site, which customers had access to the task person, face time with customers, and number of customer visits. A consulting services company can automatically track distance and time allocations of all their mobile workers to customers for billing purposes.

The system and method provides a Customer Self Service Portal with the following features. (A) A configurable and customizable web based portal which can be branded as needed by system clients. (B) A 24/7 real time view of work orders, with the ability to update or create new ones. (C) Visibility by customer into worker movement and arrivals. (d) An IVR phone based voice presentation to the customer portal. (D) Notifications via SMS (short message service) or email based on workflow rules. (E) Customer satisfaction monitoring via automated surveys.

The Sys Op decides to enable their customers to view location and estimated arrival time of visiting service worker by logging in to a secure web page, or to request to be notified when the mobile worker is within X predetermined miles of their location. The Sys Op Customer can provide quality related feedback via an online survey in the portal or by email. The Customer is able to order additional services via access to live work orders. This "add services/goods" feature permits the Sys OP, upon the real time request of its customer, to provide additional goods or services to the customer or enable cross selling of goods and services to the customer without requiring live human resource.

The system and method provides a Real Time and Secure Information Exchange with the following features: (A) Optimized for smartphone and limited bandwidth environments. (B) Caching mechanism to enable access to critical data even when the device is out of range. (C) Open set of APIs to enable extension of 3rd party applications such as ERP/CRM to the mobile world. (D) Mobile workers have immediate and real time access to the latest customer information, products, and inventory. (D) Customer profiles can be automatically relayed to the worker's handheld prior to arrival, resulting in a prepared worker and a superior service engagement (or first call resolution rate, or sales close). (E) Mobile workers can remotely update the customer profile, capture critical data from the field, perform form based reporting, execute payment/billing transactions, and any other high-value activity that system has enabled for a smart device.

The system and method provides a wide range of settings for the Sys Op as follows: (A) Global Settings—define the settings that apply to all the users of the company (SMS, customer portal). (B) Payment Options—configure the payment options for work orders (Retainer, Credit Card, PayPal). (C) Rule-based operations—configure system operation. (D) Work Orders ("WOs")—configure work orders (the forms that are attached to a work order, the custom print view). (E) Customers—configure customers (the forms that are attached to a customer, the custom print view). (F) Forms Presentation and Data Input—configure Sys Op forms as data input and output templates. (G) Tasks—configure tasks (categories). (H) Activity—configure the custom activity types. (I) Quick Launch Settings—configure links that appear in the "Quick Launch" panel. (J) User Permissions Templates—configure the user permissions templates that can be assigned to users.

Time-On-Site

The System Time-On-Site module is an automated tracking & reporting solution for organizations that need to analyze the amount of time their workers spend on site, but without infringing on their personal privacy.

The System Time-On-Site tracks the amount of time each worker spends at predetermined locations such as customer or project sites without tracking their personal or professional whereabouts and activities in between. If the Sys Op is interested in tracking and visualizing all movements and locations, the general system operations described above enables that feature.

System Time-On-Site provides automated and concise reports that are sent by email daily and weekly (time, day of the week, date, date range, frequency, destination are all fully customizable). In addition, the reports can be generated for any given time frame or combination of users via the web interface.

System Time-On-Site is a solution that provides key visibility and insight (e.g. which customer was visited and for how long, how long ago was that specific customer location visited and by whom?) while simplifying the day-to-day tasks of the Sys Op mobile workforce (automated activity report, expense report documentation and validation) as well as giving the task person or mobile worker the peace of mind that their privacy rights are secure and respected.

A summary of the Time-On-Site module follows. The GPS enabled smart phone or computer tablet or GPS enabled electronic device, with a telecom link, is carried by the mobile worker. The GPS enabled smart device contains a System Time-On-Site native application that captures the locations of the user—task person and securely communicates that geo location, time and date data to the system's web based servers. On the server side, the Time-On-Site module analyses those locations and computes actual movement versus idle segments. For each idle segment, System Time-On-Site searches from the list of predefined addresses (e.g. customer or partners address) to find a match. If there is a match, the corresponding idle segment is saved and it will be used as part of the reporting. Otherwise, it is discarded.

Office Coordinators and Management automatically receive a daily and weekly summary report by email. These authorized Sys Op persons can also log in to their web portal for real-time access to the geo tracking information or to generate the report for a given time frame and user(s) and Geo-enabled devices.

Additional features of the Time-on-site module include: (i) Associate actions (email, forms to be filled out) whenever the mobile worker enters or leaves a location. (ii) Capture and visualize the entire path of the mobile worker (e.g. to automate and securely generate expense reports). (iii) Capture critical information from the field (payment, signature, audio, images). (iv) Use the system APIs to automatically provision and maintain the Sys Op list of relevant addresses. (v) Add automated surveys to ensure quality of service and get customer feedback.

Further, the time on site module can be enhanced to record and visualize the type, beginning time, ending time and duration of each movement segment from the movements of a person, thing, or apparatus associated to a device that records the corresponding geographical locations and time stamps. The resulting chronological output is based on the traditional time sheet format except that each individual time block corresponds to a movement segment (Idle, Moving . . . ). Each block also has an associated link to visualize the corresponding details (type, duration, beginning time, end time, distance (if applicable) . . . ). This method can also be used to visualize the appointments in conjunction with the corresponding movement segments.

Details of the General System

FIG. 1 diagrammatically illustrates a system diagram of the present invention. It should be noted that the method and computer system can be located on a singular server controlled and operated by single Sys Op, or, in the alternative, the method and system can be distributed over a plurality of computer systems and networks. FIG. 1 diagrammatically illustrates both a centralized operation of the method as well as a distributed operation of the method.

FIG. 1 shows a task person T-person 6 at location TP-6a. Task person 6 has a smartphone 7 which communicates via a cellular telecommunications network to telecom network A. Telecom network A is connected to internet 10 which in turn is coupled to a plurality of computer systems. Sometimes, the Internet is referred to as a telecom network. The general operations of these computer systems are known to persons of ordinary skills in the art. Only major system modules associated with the inventive system and method are discussed herein.

Task person T-person 8 is located at location TP-8a. Task person 8 carries with him or her a computer tablet 9 that has telecommunications link to Telecom Network A or Telecom Network B. Both smartphones 7 and computer tablet 9 and other GPS-enabled devices use a satellite supported global positioning signal (GPS) which is detected by devices 7, 9. The GPS signal is utilized by smartphone 7 and computer tablet 9 to mark its location and provide information to persons 6, 8.

These task persons may be required to visit equipment store 12 at location ST-a prior to visiting customer A at location A-1, customer B at location B-1 or any other customers. Customer A at location A-1 has a telephone 14 which is diagrammatically illustrated as being connected to the telecommunications network which includes Internet 10. Customer A also includes a computer 16 which is linked to a telecommunications network and ultimately to Internet 10. Telecom network A and telecom network B are either integral with Internet network 10 or can be effectively considered an extension of Internet 10 utilizing common telecommunications system such as land line, satellite and cellular telephone communications systems. Customer B has a service location at location B-1 but currently customer B is located in office building 18. Customer B carries with him smartphone 19. Office building 18 is at location B-2 which is distant from customer B location B-1. Therefore, when customer B who is carrying smartphone 19 needs to visit the service person or sales person at location B-1, the cell phone 19 of customer B should be utilized to arrange and coordinate the simultaneous visit of task person 6, 8 at location B-1 with customer B at location B-1. As discussed later, this coordination of both the service person or task person and customer B at distant location B-1 is accomplished.

Internet 10 or telecommunications network 10 is connected to System Operator I server 20. Server 20 includes a computer processor 22 and a memory system 24 and various input/output devices 26. These devices cooperate and permit Server I of System Operator I to communicate with database I 28. Additionally, System Operator I server 20 utilizes telecommunications input/output module 30 to communicate with smartphones 7, 19 and tablet computer 9 as well as customer A computer 16 via Internet 10, telecommunications networks A and B. System Operator server I is further connected to a network 28 linking the server I to an administrator computer 30, a manager A computer 32, a manager B computer 34 and various task team members 36. Task team members 36 have team member smartphone TT-A and smartphone TT-B. Manager A also has his or her cell phone 31 and manager B has her cell phone 33. As described later in conjunction with the Tables 2A to 2K and Tables 3A to 3R, System Operator I server 20 can fully engage all the features of the present invention.

However, there is a distinct benefit in utilizing the present method and the computer system in a distributed manner such as a software as a service (SAAS). In this distributed computer system and method, the present invention utilizes a trusted third party (TTP) server system 38. TTP server 38 includes all the elements customarily found in computer systems including interactive voice response (IVR) module 40 and telecommunications input and output module 42. TTP server 38 interacts with a plurality of databases effectively isolating sensitive data from System Operator I in database system I-44 from the data from System Operator II and database II-46. Customer data of the trusted third party System Operator 38 is stored in TTP customer database 48. Of course, a singular database may be utilized and different portions of that database would hold the secure or secret information for System Operator I as compared with System Operator II and as further compared with TTP customer database 48.

Internet and telecommunications network 10 is also connected to System Operator III server 50. System Operator IV server 52 is further connected to the telecommunications network 10. System Operator IV has access to database system IV-54. System Operator IV utilizes its own telecom input and output 56 which generates satellite communications links to task person 4 who retains smartphone 5.

FIGS. 2A to 2K diagrammatically illustrate a number of tables having field identifiers which are useful for carrying out the basic elements of the present invention. In "activities today" table in FIG. 2A has data fields for the title of the activity, the user who is viewing the activity, the time of the activity as well as the work order (WO) task, customer in action. All these tables can be reconfigured to closely match the business of the System Operator.

The abbreviations used in the Tables and in FIG. 1 are sometimes identified in the Abbreviations Table at the end of this patent specification. Otherwise, abbreviations are identified in the description of the invention.

FIG. 2B shows a Customer's Table which includes name, address, primary contact at the customer location as well as action associated with the customer.

FIG. 2C is a work order WO Table which identifies: the type of file operative for the open work order, the customer, the customer location, the status of the work order, a date and time for the projected delivery of goods or services at the customer location, the task person, and a field for confirming whether the task person recognizes (ACK) the assignment or not and an action field.

FIG. 2D is a list of equipment necessary to provide the goods or services at the customer location.

FIG. 2E provides an outline for the work order reports. These reports are generated both prior to the work being delivered at the customer location and also while the task person is at the customer location. Identification of a function ("FNC") is also shown in the Table. For example, under the "create report" header, the function (fnc) is YES which, when activated from the user on the smartphone or the web based interface portal provided by the system operator, the user (task person) can select YES generate the report and the system will generate an electronic fix copy of the report. In the absence of selecting YES, the system does not create the report. Hence, the create report has a function as identified in the table.

It should be noted that many, if not all, of these Tables are fully reproducible on smartphones carried by the user or task person.

FIG. 2F is a short form balance sheet for a particular customer. FIG. 2G is a "task table" that identifies: the file type, the identification number of the particular task, the status of the task (pending, closed, open), the category of the task, a task description, a "data action required" filed, and a "status" field.

FIG. 2H is a "user table" (a task person table) with a login identifier name, a status and an action required field.

FIG. 2I list a "partner" table. Partners are well established customers or suppliers. FIG. 2J is a table for "devices." Typically, "devices" listed in the Tables are the GPS-enabled electronic devices, cellphones, smartphones, computer tablets and other GPS-enabled devices, all of which include a telecommunications link FIG. 2K is a listing of the products.

FIGS. 3A-3R diagrammatically illustrate another group of tables which are partially complete and which represent a working embodiment of the present invention. FIGS. 3A-3R provide examples of the system. The system can be configured in various manners and the tables can be expanded or contracted to adapt to any particular business. However, FIGS. 3A to 3R represent at least one working embodiment.

FIG. 3A is a configured table showing the initial screen presented to the user who is logged in to the system. That screen includes four different sections a "new notifications" section, a "new-unassigned work order" section, an "assigned work order" section and an "activities today" section. This initial presentation can be altered by the user under his or her settings function. Under "new notifications," the fields for the database or spreadsheet (a two dimensional database) include type, Id for the notification, date, description, a function enabling the user to view the entire alarm or notification record, a function to enable the user to accept the notification and another function to permit the operator to delete the notification record. The user may select to various functions and this is noted in these tables as "u-sel." Therefore, a notification is set for an "alarm" with a notification id record "123" and is set for date "Oct. 10, 2011." The event is a potential low battery on a particular GPS-enabled device. The user can view the entire record by selecting V (view), can accept the notification (ACC or ACK), or can delete the notification (del).

The "new-unassigned work orders" table is typically presented to managers of the System Operator. The identification and the title of the work order is provided in the far left column. The customer and a customer location listed in the next column. The status of the unassigned work order is open, pending or closed. Dates and actions are noted in the Table.

For "assigned work orders," again, the title and id of the work force is provided, the customer, status, date and task person assigned to the WO is listed. Preferably, the phone number of the task person is also provided. This data is part of the task person data collection maintained in one or more of the databases 28, 44, 46, 54 in FIG. 1. As an example of a particular layout, the user is presented with certain functions external to the table identified as "X-Table fnc" or "XT-fnc"). Therefore, with respect to new and unassigned work orders, the user can select "go to page 2" of the unassigned work order, "go to page 3," etc. With respect to assigned work orders, the external table function is abbreviated "XT-fnc." The "Activities today" Table is self explanatory.

If the user or System Operator selects a particular notification from the initial screen, a table such as FIG. 3B is generated by the processor server 20 or 38. It is well known that computer systems and, in particular, web based computer systems utilize servers to provide a data display screen which enables the user at computer tablet 9, smartphone 7 and computer 16 to respond and input data and manipulate data presented by the server. FIG. 3B shows a configured table for new and old notification. The type of notification and id of the notification is indicated as "alarm 123." This is the same "alarm 123" as identified in FIG. 3A. Therefore, FIG. 3B shows all the data collection or data record for that notification 123. The notification includes a message, the date the message was acknowledged (ACK), who acknowledged the message, a criticality indicator or alarm, a status of the notification, the creation date of the notification record, the date the notification was adequately responded to (closed date) and who closed the date. With respect to "status," the data may reflect and acknowledgment ack, a pending indicator or a field to delete or indicate NO.

FIG. 3C is a configured table which the user sees once he or she selects the assigned work order WO from the main menu of FIG. 3A.

With respect to FIGS. 3C to 3J, the same menu functions are provided along the top row of the screen enabling the user to select a folder or directory under: summary, equipment records, note records, documents, forms, activities, bills and history. These directories or file selections are underlined in FIG. 3C-3J. The folder which is underlined and shown in bold has been activated in the particular figure. Therefore, FIG. 3C is a summary of the assigned work orders ("summary" shown in bold print), FIG. 3D is the "equipment associated" with a particular record, FIG. 3E are "notes" assigned to a work order, FIG. 3F are "documents" available for that particular work order. FIG. 3G is "forms" associated with either the equipment or the service to be provided to the customer for that work order. FIG. 3H is an "activity log" for the work order. FIG. 3I shows the bills or accounting for a particular work order and FIG. 3J shows the history of that work order.

Returning to FIG. 3C, the "summary" of the work order includes fields for status, date created, customer, location, the task assigned person, the projected appointment data, an estimate of the duration of the service (time on site) regarding how long the service person or sale person will be at the customer location. A confirmed status field as well as various functional inputs are provided. These functional inputs include the ability of the user who is viewing the FIG. 3C "work order summary" to "input" data, "see more data" on a particular field, "mark as critical" certain fields and aspects and data in that table, "acknowledge" that the work was done and "input more" data.

FIG. 3C also lists the travel time and the time-on-site which is calculated and stored as discussed later herein.

FIG. 3D is an equipment table associated with the work order. The equipment table can be changed to reflect any particular information necessary about the equipment.

FIG. 3E is a "note" associated with a particular work order. In FIG. 3E, the user can pull down a list of personnel such as the task person, the manager, the system operator, administrator. That selected person cna then annotate the Notes record for the work order WO. Therefore, the task person and anyone associated with that work order, such as task team 36 or manager A32 or manager B34 or administrator 30 can annotate the "note" record associated with a particular work order.

FIG. 3F are the "documents available" and FIG. 3G are "forms available" to the person. FIG. 3H shows an activity log for a particular work order.

FIG. 3I shows a billing table for a particular work order. FIG. 3J shows an accounting history for that customer.

It is important to realize that task person 6 carrying smartphone 7 or task person 8 carrying computer tablet 9 can access this information in Tables 3A-3R both prior to beginning the drive to equipment store 12, to customer location A-1 or to customer location B-1. In this manner, the information stored in all these tables is transparent to the entire management team.

FIG. 3K shows a main menu listing four top level selections. In other words, the user, when viewing the main menu, can select home, customer, work orders, task, activity, account or help. Sub-file or folders are available under the "work orders" folder which include work orders, equipments and reports. Under the "reports" sub-folders, is a series of secondary sub-folders or sub-subfolders which include work orders, and balance sheets. Under "task," the sub-folders are task and reports. Under "activity," the sub-folders are schedule, notification (with sub-folders notifications, messages and alarms), locations (with sub-subfolders last known, task person time sheet, task person geographic path) and reports (sub-subfolders activity report). The account main folder includes sub-folders for user, partners, devices, products, setting, my settings, and administration. Many of these tables and data input screen are discussed earlier in connection with FIG. 2A to 2K and 3A to 3R.

FIG. 3L shows a configured table for activity and schedule. The functions presented to the user include an option to select the daily time schedule for task person A, task B and task person C. Alternatively, the user can select a monthly calendar display. Additionally, the user may select all tasks assigned to a particular user or select "all users" by group name or select a user by smartphone or device. As stated earlier, the device is a listing of all the Internet and GPS-enabled devices carried by all task persons and managers administrators. Alternatively, the user can select the geographic device or group of geographic devices.

Under "display daily calendar" function, FIG. 3L has a vertical time blocks 8 AM, 8:30 AM and 9:00 AM extending down through the evening hours. The rows are identified by the Task Person A, B and C. If the user selects smartphone, the smartphone ids would be atop the column headers.

FIG. 3M is an "activity notification" Table which again shows a daily calendar identified by column headers for task person A, B and C. The user can select a single user in a monthly calendar display or all users in a daily calendar display as well as smartphone device or geographic or GPS-enabled device.

FIG. 3N is a last known location which displays a map with location points showing the last known location of a particular task person. The user can select smartphone in a group, or singular user with a smartphone as well as a GPS-enabled device or a group of GPS-enabled devices.

FIG. 3O is a location time sheet tracker. A display daily calendar shows task person A or task person smartphone or task person computer tablet with data filled in the row associated with a time block. Therefore, at 8:00 AM, task person A has data in their time block extending to 9:00 AM. Compared this data with the computer tablet listing only an 8:30 data entry. The user is permitted to select various users, groups or task persons or GPS-enabled devices.

FIG. 3P is a location and geographic tracker. This enables the user to select a task person, smartphone device, or various groups of devices. A map is displayed to the user and under the map is a critical marker Table identifying the critical nature of the task being reviewed. Further, a status of the GPS-enabled device is shown. The status is idle, moving, or out of range. A total time of travel as well as a total of time on site is provided in this table.

The table beneath the geo tracking map also shows the start time as well as the time on site. An approximate distance to the customer location A-1 or B-1 is provided in this table.

FIG. 3Q discloses an activity Id, a user, customer and enables the user to input display or select calendar.

FIG. 3R discloses an "account" Table showing a sub-account for all users, partners, devices, products etc.

Details of the Movement and Idle Segmentation

Figure 4:
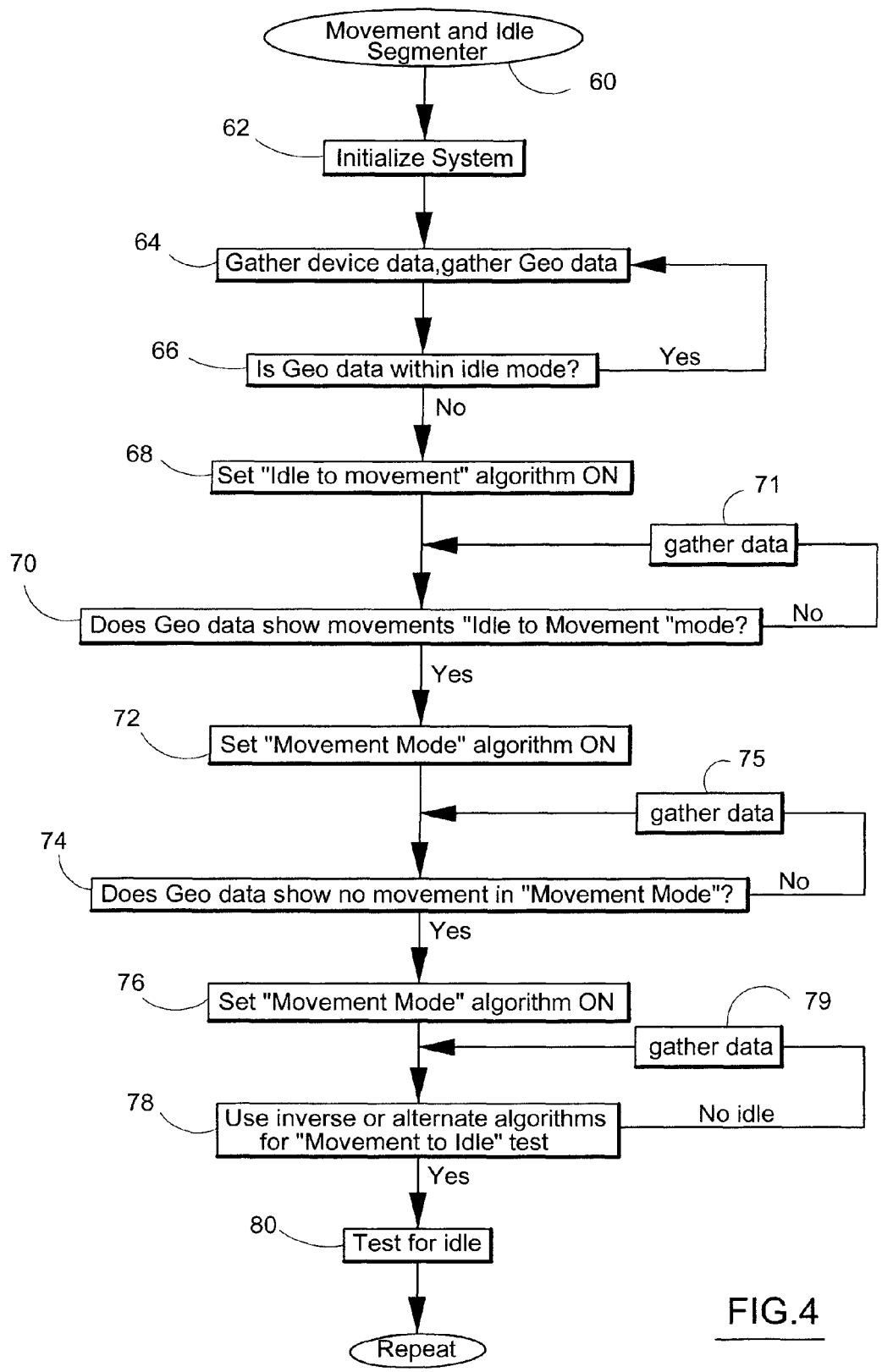
FIG. 4 diagrammatically illustrates the flowchart, routines and software modules for the movement and idle segmentor in accordance with the principles of the present invention.

FIG. 4 diagrammatically illustrates the movement and idle segmentor program in accordance with the principles of the present invention. In order to determine the travel time and provide travel time indicator data as well as on-site indicator data and time on site data, it is important to determine whether the GPS-enabled device is moving or is idle or at a singular general geographic location. The movement and idle segmentation routine 60 first initializes the system at step 62. In step 64, the system and primarily the web based process server gathers GPS data from smartphone 7, computer tablet 9 or smartphone 5 as well as id data indicating which one of the GPS-enabled devices is sending this information. Currently, GPS-enabled devices record a GPS signal in the memory of the smart phone or enabled device. The present system opens a telecommunications channel between one of the web processors 20, 30, 50, 52 and the GPS-enabled devices 7, 9, 5. Currently, every 6 seconds (as an example), the web based interface on the processor-server (for example 20, 38), requests that the GPS-enabled device 7, 9 upload the GPS location and time stamp data to the web based servers 20, 38. An interface portal to the Internet, and ultimately to the GPS device is enabled by the server 20, 38. Therefore, the servers accumulate this GPS location and time data and store the same in the appropriate database 28, 44, 46, 54. It is this data that is processed by the processors in servers 20, 30, 50, 52.

In step 66, a test is made of the data to determine whether the GPS-enabled device is in an "idle" mode. If YES, the program repeats to step 64. If NO, the system executes step 68.

Equation 1 and Alternate Equation 1 which follows describe two algorithms to determine whether the GPS-enabled device is in an idle mode.

TABLE

Equation 1

Eq. 1: Is the distance between
    (centerpoint of p most recent geo.pts.)
        and
    (Centerpoint of n geo.pts.)
    less than an Idle-Thresold value (where p is different than n)
If YES, then geo within Idle zone
wherein n>p
Alternate Eq. 1:
    Obtain:
        loc. at t1
        loc. at t2
        loc. at t3
        Calculate centerpoint CP1 with loc. data at t1, t2, t3
        Determine if loc. at time tk < CP1 plus 25 meters ("25" = distance "D-idle")
        If YES, update Centerpoint CPk, within idle zone.
        If NO, execute next program step In Equation 1, the distance between two center points is compared. A center or "center point" is determined by taking a group of sequential geographic data and engaging an algorithm to determine the center of location of that aggregated geographic data. A center point CP of data group p for the most recently acquired geographic data is calculated. Also, a center point of a different group n of geographic data is created. The system determines the distance or difference between these center point data collections p and n. If the absolute value of the distance is less than an idle threshold value, then the system indicates that the GPS smartphone is in an idle mode. Generally, n geographic points is larger than p geographic points. With respect to alternate Equation 1, the location is obtained at times t1, t2 and t3. The center cp1 is computed. Of course, many more geographic points other than sequential times t1, t2 and t3 could be utilized. If the current location at time Tk is less than cp1 plus a predetermined value such as 25 meters called D-idle threshold, then the system determines that the smartphone is no longer in an idle mode. If the current geographic location is less than the cp1+distance threshold, the system notes that the smartphone is within the idle zone. If not, the system executes steps 68.

In FIG. 4, step 68 turns ON the "idle to movement" algorithm. The Equations 2A, 2B, 2C and 2D may be utilized in the "idle to movement" algorithm step 68.

TABLE

Equation 2

Eq. 2A  Point to Point Velocity
    Is velocity at each acquired geo. pt.
    over time span (tspan1) increasing?
        (geo at t1 less geo at t2)/(t2 less t1) = vel. t2
        (geo at t2 less geo at t3)/(t3 less t2) = vel. t3
    Is vel. t2 < vel. t3 < vel.t4 < vel.t5?
Eq. 2B  Interval Velocity
    Distance traveled over Z, one minute intervals
        (geo at t1) less (geo at t1 plus 1 minute) = D-interval-1
        (geo at t1) plus (geo at t1 plus 2 min) = D-interval-2
  Is  (D-interval-1) less (D-interval-2)/ (2 min) > a Velocity threshold
  Then movement detected.
Eq. 2C  Use center point data for "Point to Point" Vel and "Interval" Vel
Eq. 2D  Use center point data for t period prior to "Mode ON," t1, t2, t3, t4 all antecedent times prior to "mode ON" then test for:
    CP – geo at t "mode on 1" = D to CP1 note: distance to CP centerpoint
    CP – geo at t "mode on 2" = D to CP2 etc.
    If (D to CP 1) < (D to CP2) < (D to CP3) . . . then "movement" detected Equation 2A is a point to point velocity equation wherein a velocity at each acquired geographic point over a certain time span is calculated. The velocity over t1 to t2 is obtained and compared with the velocity of t2 to t3. If the velocity at various time spans is increasing such as the velocity between time t1 and t2 and the velocity between times t2 and t3 and the velocity times t3 and t4 and the velocity between times t4 and t5 is increasing, then step 68 determines that the GPS-enabled device is showing "movement" as noted in step 70. The YES branched is then taken from step 70.

Equation 2B is an interval velocity calculation which looks at the velocity between two non sequential time data points. These non sequential data points are called d-interval-1 and d-interval-2. The distance between these two intervals is calculated and is divided by the time period of the time stamp for location at t1 as compared with the time stamp for a time at the predetermined interval t2. If the velocity is greater than a velocity threshold value, then "movement" is detected in step 70.

In Equation 2C, a center point data is utilized for the sequential time intervals and for the interval velocity shown in Equations 2A and 2B.

Equation 2D uses the center point data for a time period prior to "mode ON." Data from antecedent time t1, t2, t3, t4 (antecedent to "mode ON") is gathered prior to the time when the system detected the "idle to movement" ON. A test is made from the center point of that antecedent data to when the geographic data for the "mode ON" is detected. The resultant is a distance currently detected as compared with the previous center point distance CP1. The next calculation determines the center point of the current data group (not the antecedent data group) to determine the distance between the first center point and the post "mode on" data. The resultant is the distance to CP2. If the distances from the first center point as compared to the distance to the second center point are increasing then movement is detected.

Returning to FIG. 4, if movement is detected in step 70, the YES branch is taken and the system executes step 72 which turns ON the "movement mode" algorithm. Equations 3, 3A, 3B and 3C show examples of a "movement mode" algorithm. Step 74 enables processing of one or more of these algorithms to determine whether the GPS-enabled device is being moved.

In Equation 3, the velocity is calculated between two times, t1 and t2. A threshold is used in the system (set) and the system determines whether the velocity exceeds a human walking speed threshold. The human walking is typically 5 kph (3 mph). If the velocity at two time periods t1 through t2, t2 to t3, is greater than the human walking speed, the "movement mode" is turn ON. In Equation 3A, a further velocity check is conducted by the system. If the GPS-enabled device is moving faster than 16 kph (10 mph), the system is still determining that the GPS-enabled device is moving.

Equation 3B is a determination of two velocities over two different time frames. The velocity at t1 through t2 as compared to the velocity at t3 trough t4. Further, if a differences in velocities exceed a threshold V differential, then the system continues to determine that the "movement mode" is ON for that particular GPS-enabled device. Equation 3C utilizes algorithm with distance traveled data per a predetermined time frame and also and antecedent distance and velocity and a post-modal distance and velocity, all as compared with a more recent time interval.

Several algorithms could be utilized and the equations presented herein are only examples. If the GPS is still moving, the YES branch is taken and the system in step 76 sets the "movement to idle" algorithm ON. The "movement to idle" algorithm is the inverse of the "idle to movement" algorithm executed in connection with step 68, that is, Equation 2. In step 78, this inverse algorithm is used for the "movement to idle test." If no "movement to idle" outcome is noted by the equations and algorithms, the step continues to gather data as noted in step 79.

If the YES, branch is taken indicating that the GPS device is slowing to an idle, the system executes steps 80 which tests for the "idle" mode. This is noted in Equation 1 above.

It should be noted that since the system has data indicating the location of Customer A location A-1 as compared to customer B location B-1, and the system further continuously accepts GPS signal data from the smartphone devices carried by the task person, it is easy to determine when the task person arrives at customer location A-1 as compared to customer location B-1. A simple match achieves this "at location" test. However, the system also computes on a regular basis the travel time from location TP-6a, which is the initial location of smartphone 7, to customer location A-1. This travel time is logged into either the summary of the assigned work order table in FIG. 3C as time traveled field (which may require an additional field in Table 3C). The time traveled field may also be utilized in FIG. 3P as the location geo tracker. Additionally, the actual distance traveled by the task person 6 from the location TP-6a to location A-1 can be calculated. These distance calculations are provided by other algorithms known to persons of ordinary skills in the art. Since the system also detects "time at idle" position, a "time on site" calculation can be calculated from the idle data. The time on site is simply the time in the idle mode after smartphone 7 GPS location matches customer location A-1. The idle time is accumulated and calculated and ultimately posted in work order menu FIG. 3C and in location geo tracker display FIG. 3P when the smartphone leaves the "idle mode" state and enters the "idle to movement" state. However, the true test of when the smartphone and the task person leaves customer location A-1 occurs after the customer location match and after the "idle to movement mode" is detected and when the smartphone is in the "movement" mode. When this "movement" mode is detected, the system notes the time and calculates the "time on the site" and fills the data field in FIG. 3C as well as the time on site field in FIG. 3P.

As a result, the billing and accounting or back office program for the present invention can calculate the profit and loss ratio for the projected service time at location A-1 or the amount of face time the task person 6 spent at customer location A-1. Further, an analysis can be made of the travel time from tp6a to location A-1. Since the billing cycle and the travel time and the time on site is all integrated ultimately into the profit margin of the business, this information is of high value to both the managers, the team members, and the system administrator.

Figure 5:
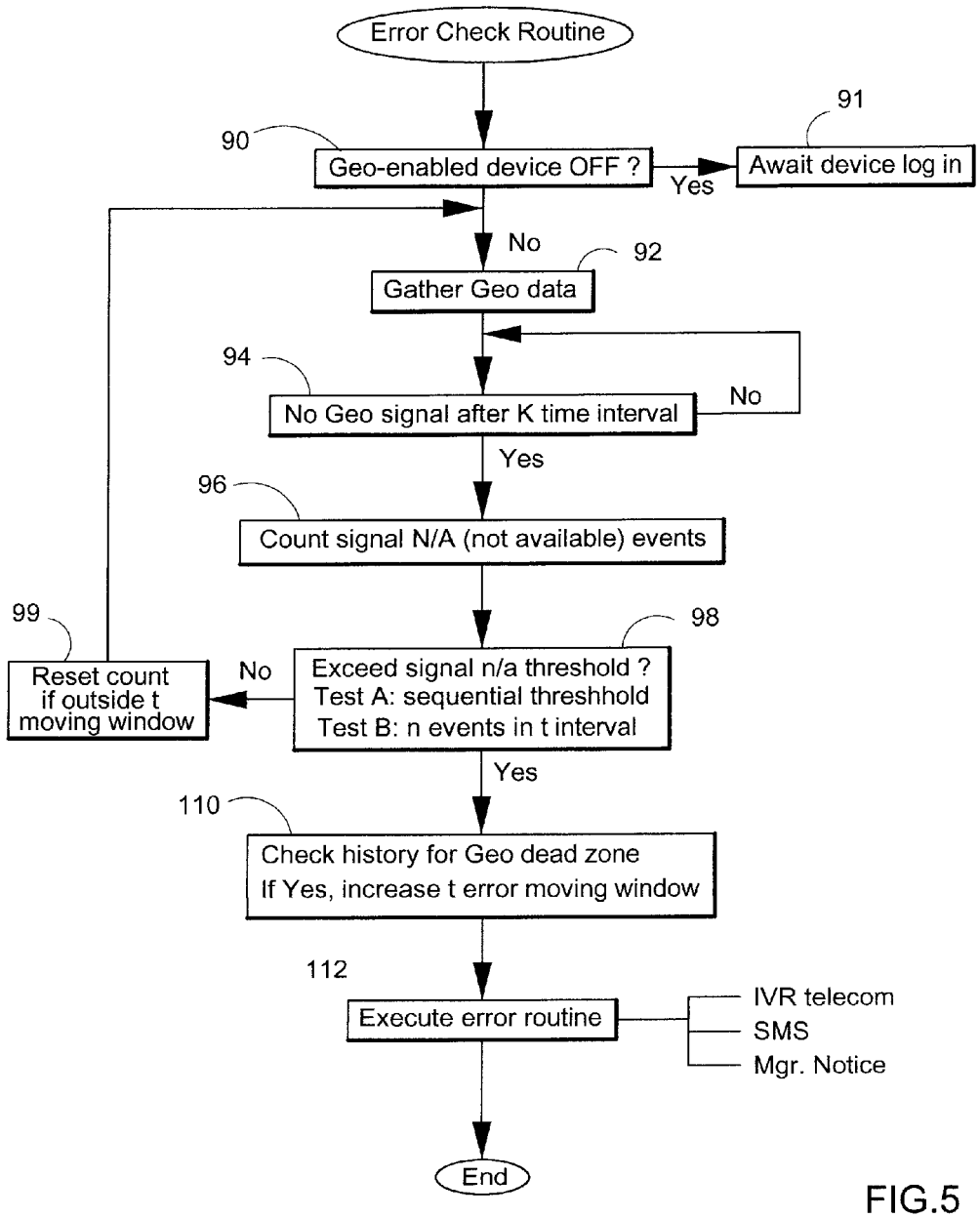
FIG. 5 diagrammatically illustrates a flowchart showing one implementation of the error checking routine.

There are certain errors involved in capturing this GPS data from GPS-enabled devices. For example, the GPS data acquisition can be interrupted by a poor telecommunications channel, a lack of cell phone coverage, and a lack of GPS signal reception by the smartphone or GPS-enabled device. Therefore, FIG. 5 shows an error checking routine which is an example of at least one method to recognize these errors. In step 90, a determination is made whether the geo enabled device if OFF. If YES, the system waits until the device logs-in in step 91. If NO, meaning that the geo enabled device is ON and logged in, the system executes step 92 which gathers the geographic time stamp location data from the smartphone. In step 94 the system determines whether there has been no GPS signal after a certain time interval K. If NO, the system loops back to gather step 92. If YES, the system executes step 96 which counts the signal "not available" (n/a) time events. In a 6 second cycle, three n/a counts are logged in a 20 second time interval. In step 98 the system determines whether the n/a GPS count exceeds a threshold value. One error is whether sequential acquisition times t1, t2, t3 have been missed (three n/a counts in 20 sec). In the present working embodiment, the system gathers GPS signal every 6 seconds. If the signal is not received by the process server for 1 minute, this is 10 unit time interval, equal to 10 n/a counts. Test A in step 98 may be met that if the GPS signal has not received four 10 sampling times (represented 1 minute) the YES branch is taken. Test B in step 98 determines whether there has been an n number of n/a events within a certain time interval T-error. In other words, if there are 6 non available GPS signal events within a five minute T-error time period, the system is programmed to generate a YES indicator from step 98. If the signal n/a threshold has not been met, the NO branch is taken and in step 99 the system resets the n/a signal count if the oldest n/a signal count falls outside of the moving time interval window. The system returns to gather geo data step 92.

If the GPS n/a signal threshold has been exceeded, the YES branch is taken from step 98 and the system in step 110 checks the history of all of the GPS-enabled device to determine whether the current or last confirmed GPS signal is within a "geo dead zone." If a history for a plurality of GPS-enabled devices shows that there is a geographic dead zone in or near the current location, the YES branch is taken and the time interval is expanded for the n/a threshold task 98. By expanding the time threshold in step 98, the system looks for a greater number of n/a events to better track the current GPS location. If history does not indicate a geographic GPS dead zone, the system executes step 112 which institutes an error routine.

The error routine may involve an interactive voice response or IVR telephone call to the smarphone 7 of task person 6, a short message service sms to smartphone 7 or a notice to a manager A32. Other error routines could be utilized.

Once an error is noted, the type of error and the degree of Sys. Op. notification should be posted in Table FIG. 3B. In this manner, the type of error and any corrective steps may be taken by the Sys. Op. manager or other supervisor.

Figure 6:
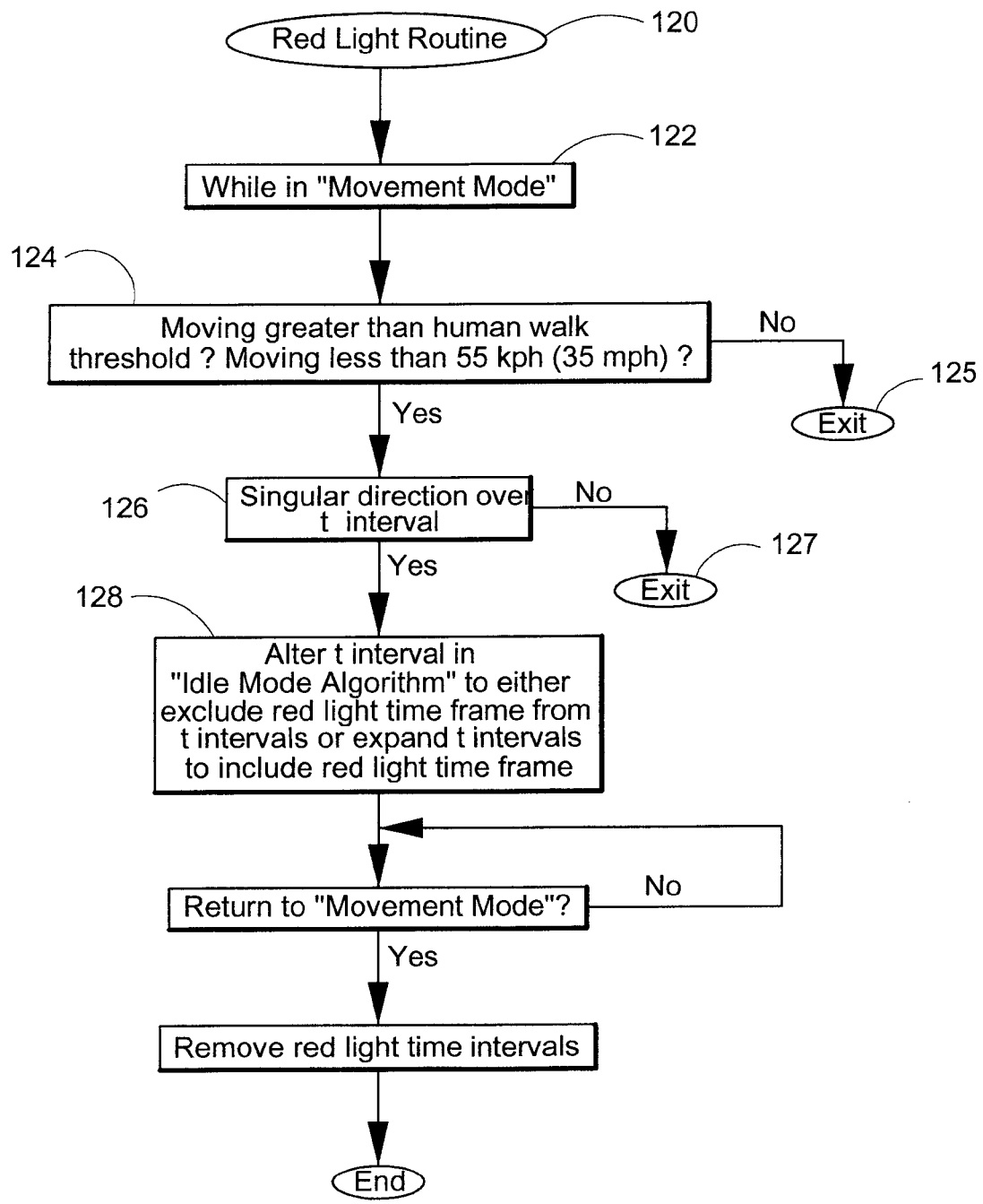
FIG. 6 diagrammatically illustrates a example of a flowchart for a red light routine which alters the idle mode algorithm.

FIG. 6 diagrammatically illustrates a red light routine 120 which supplements the idle mode routine. In step 122, a determination is made that the system and the monitor GPS device is in a movement mode. In step 124, a determination is made whether the GPS device is moving greater than a human walk threshold and is moving less than 55 kph (35 mph). If not, the system exist the program at step 125. The reason for testing for "greater than walk" speed and the "less than 55 kph" is that in city traffic, the typical vehicle speed between traffic lights on a city road is greater than a human walk speed (5 kph) and is less than the 55 kph speed. If YES, the system executes step 126 which determines whether the GPS device is moving in a singular direction over a certain t time interval. This is a directional test of sequential data. If not, the system executes at step 137. If YES, the system executes step 128 which alters the time intervals in the idle mode algorithm to either exclude red light time frame from the time interval or expand the time intervals to include the red light time frame. In other words, if the task person 6 is stopped at a red light, the system adapts to expand the time frame to determine when the system and the GPS device is in idle mode. The red light time frame can be obtained by the local jurisdiction based on traffic patterns.

Record and Visualize Type, Key Times, Duration of Geo Data

The present invention relates to a system, a method and a computer program to analyze time stamp location data or GPS signal data, produce movement and idle segments for the task person (user) or GPS-enabled machine or equipment, transform the series of GPS signal data into time-on-site indicator data, and record and visualize the type, beginning time, ending time and duration of each movement segment from the set of time stamped location data. The resulting chronological output is based on the traditional time sheet format except that each individual time block corresponds to a movement segment (Idle, Moving . . . ). Each block also has an associated link to visualize the corresponding details (type, duration, beginning time, end time, distance (if applicable) . . . ). This method can also be used to visualize the appointments in conjunction with the corresponding movement segments.

Figure 7A:
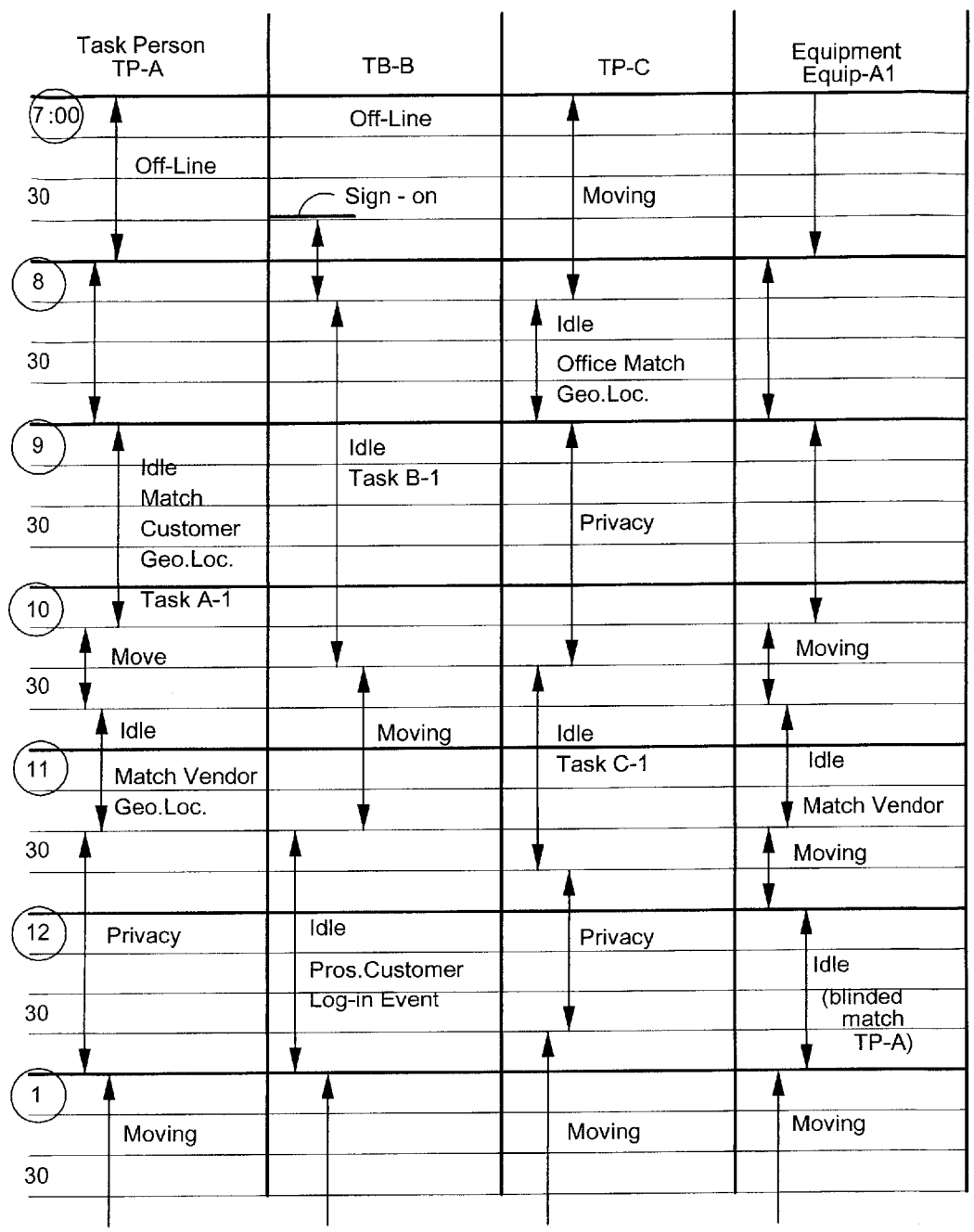
FIG. 7A diagrammatically illustrates a example of a daily calendar showing the type of status of GPS-enabled personnel and equipment.

FIG. 7A diagrammatically illustrates a time segmented and display daily calendar for three task persons, TP-A, TP-B and TP-C as well as a time segmented display for equipment Equip-A1. Referring to task person TP-A, only part of the daily time segmented display is shown. Reference to time blocks are keyed to the start time. For example, with respect to task person TP-A, the "off-line" time block from 7 AM to 8 AM is referred to herein "time block 7 AM." The daily time sheet or time segmented display in FIG. 7A is generally compiled in real time and is displayed to a manager or other person having control access to the system. The day calendar initially appears with appointments as shown in FIG. 7B. Accordingly, at the beginning of the day, prior to obtaining any GPS time stamp location data from the GPS-enabled devices, the daily time planner for task person TP-A shows, at the 9 AM time block, a scheduled task TP-A1 at geo location task A-1. Also, the task person TP-A has previously logged into the system and asserted a privacy block which blocks or masks the geo location signal and the status signals (idle or move) for the time block 12 noon to 1 PM. In contrast to the scheduled 9 AM appointment at task situs A-1, task person TP-B has not been assigned any scheduled tasks for that day. Accordingly, task person TP-B has a note "manager not assigned." Similarly, in connection with equipment A1, there is a manager note "not assigned." With respect to task person TP-C, there are no entries prior to initiating the real time acquisition of geo location data.

Returning to FIG. 7A, and with respect to TP-A, the system is offline during the 7 AM time block. This may be due to the fact that task person TP-A has disabled his or her GPS enabled device. The system could also be turned OFF during 7 AM time block and not made active until the 8 AM time block. The system is flexible enough such that with respect to task person TP-B, that person signs into the system at time block 7:30 AM. At that point, the system notes that the GPS enabled device carried by TP-B, whether a cell phone, table computer or electronic device with a GPS enabled signal, is tracked by the system.

Returning to task person TP-A, at the 8 AM time block, the system notes that the task person is moving. As discussed earlier, the system can detect an idle condition based upon certain algorithms. With respect to the record and visualize the type, time and duration of a moving segment, the key element is to determine whether the idle is ON, indicating a certain status indicator of the GPS signal, in comparison to the movement ON status indicator for that same GPS enabled device. As indicated earlier, the idle ON status indicator can be generated based upon a comparison of monitoring at least one earlier position of the GPS enabled device as compared with the presently acquired GPS location data. A distance threshold is generally used and when a distance threshold is not exceeded, the idle ON status is recorded. However, a movement ON status indicator is provided, as discussed in more detail above, when the present GPS location data is compared to at least one earlier GPS location and a distance threshold is exceeded, a velocity threshold is exceeded or change in velocity threshold is exceeded. Of course, when the idle ON status indicator is ON, the GPS enabled device is relatively located within a single territorial range. When the movement ON status indicator is generated, the idle ON status indicator is turned OFF. This occurs with respect to task person TP-A in time block 9 AM. Further, the system has determined that when the idle ON status indicator was generated, the system checks the geographic location of the task A1 and determines whether that geo location substantially matches the present GPS location of the GPS enabled device carried or utilized by task person TP-A. At time block 10:15 AM, person TP-A moves thereby indicating and generating a movement ON status indicator. At time block 10:45 AM, the system detects that the person's GPS enabled device has indicated an idle ON status indicator. The geo location at time block 10:45 AM substantially matches the same geo location of a vendor. In other words, the unique task data collection which includes task person data, task situs location data, projected time of arrival data, time on site estimated data, and task assignment data, may also include information regarding required or necessary supplies or equipment to be purchased by task person TP-A in order to fulfil a customer request.

At time block 11:30 AM, task person TP-A has turned ON a privacy event. As noted earlier, person TP-A has a pre-set privacy block at 12 noon as indicated in FIG. 7B. However, in FIG. 7A, person TP-A has turned ON a privacy event data which includes a privacy start time. The privacy ON request is made in real time whereas the block at 12 noon was pre-programmed by person TP-A. This privacy start time at 11:30 AM runs into the pre-set privacy block time beginning at 12 noon. The privacy event data ends as pre-programmed at 1 PM.

Alternatively, person TP-A could turn OFF the privacy event data indicating an end of privacy time for that event. At 1 PM, person TP-A is again on the move and the system generates a movement ON status indicator.

Person TP-B is initially off line at time block 7 AM and then signs into the system at 7:30 AM. At 8:15 AM, the system detects an idle ON status and that status is posted on the daily report. The idle/movement status is posted and published on the daily calendar report substantially in real time. "Substantially in real time" accounts for processing time that may be lost from the actual acquisition of the GPS time stamp data as compared with processing and publication of that data. As discussed herein, there are several delay processes that affect the system prior to publishing or posting the daily activities of a task person. At time 8:30 AM, person TP-B has the idle ON status indicator lit and that person is accomplishing a task at location B-1. At 10:30 AM, person TP-B is moving. At 11:30 AM, person TP-B is subject to an idle ON status indicator. As discussed later, the system may generate a communication session with person TP-B inquiring why that person has stopped. Person TP-B may then respond to the system communication by noting that person TP-B is discussing services or goods with a prospective customer. Therefore, this is identified as an "log in event" in the display. In other words, the display and system is flexible enough such that task persons can post short notes describing his or her activities in the daily log. This real time online posting of current task data is helpful to managers and system operators.

Task person TP-C first arrives at the office at 8:15 AM. The office task person and the system notes that person TP-C is in the office because the geographic location of the office substantially matches the geographic location of the GPS enabled device carried by person TP-C. That person at time block 9 AM has requested a privacy block in substantially real time. The privacy block first runs from 10:30 and then expires at 11:30. The system may be pre-set to grant a one hour privacy block automatically to any worker that requests such a block. After the expiration of that pre-set one hour privacy block, the person must request a second privacy event. At 11:30 AM, person TP-C has requested that supplemental privacy block. At 12:45 PM, person TP-C has turned OFF the privacy event data indicating an end of privacy time.

The system is also flexible enough to track GPS enabled equipment. In the far right column of FIG. 7A, equipment A1 is first idle between the time block 7 AM to 8 AM. The GPS location of equipment A1 substantially matches the GPS location of the equipment yard for the system operator. At 8 AM, the system notes that equipment A1 has a movement ON status indicator. The system then confirms that equipment A1 is assigned to the scheduled unique task of TP-A by accessing the unique task data collection. If the task data collection does not list equipment A1, a communication session may be opened with the task person handling equipment A1 or, a manager for that task person may be contacted. At time block 9 AM, equipment A1 is in the idle ON status which matches the geographic location of task A-1 utilized by task person TP-A. In this manner, the system may not engage in an initial communication session with one or more task persons or managers but may wait 3-4 hours to confirm if the equipment becomes idle at a consumer geographic location. In this manner, the system can automatically populate the unique task data collection and potentially account for the use of equipment A1 for task A1 accomplished by task person TP-A. The equipment is moving at time block 10:15 AM and then becomes idle at time block 10:30 AM. At time block 11:30 AM, the system is movement ON status. Further, the system at time block 12 noon indicates that equipment A1 is in an idle ON status. However, since the task person TP-A has previously privacy blocked that time frame, the system automatically blocks the idle location of equipment A1.

Figure 8A:
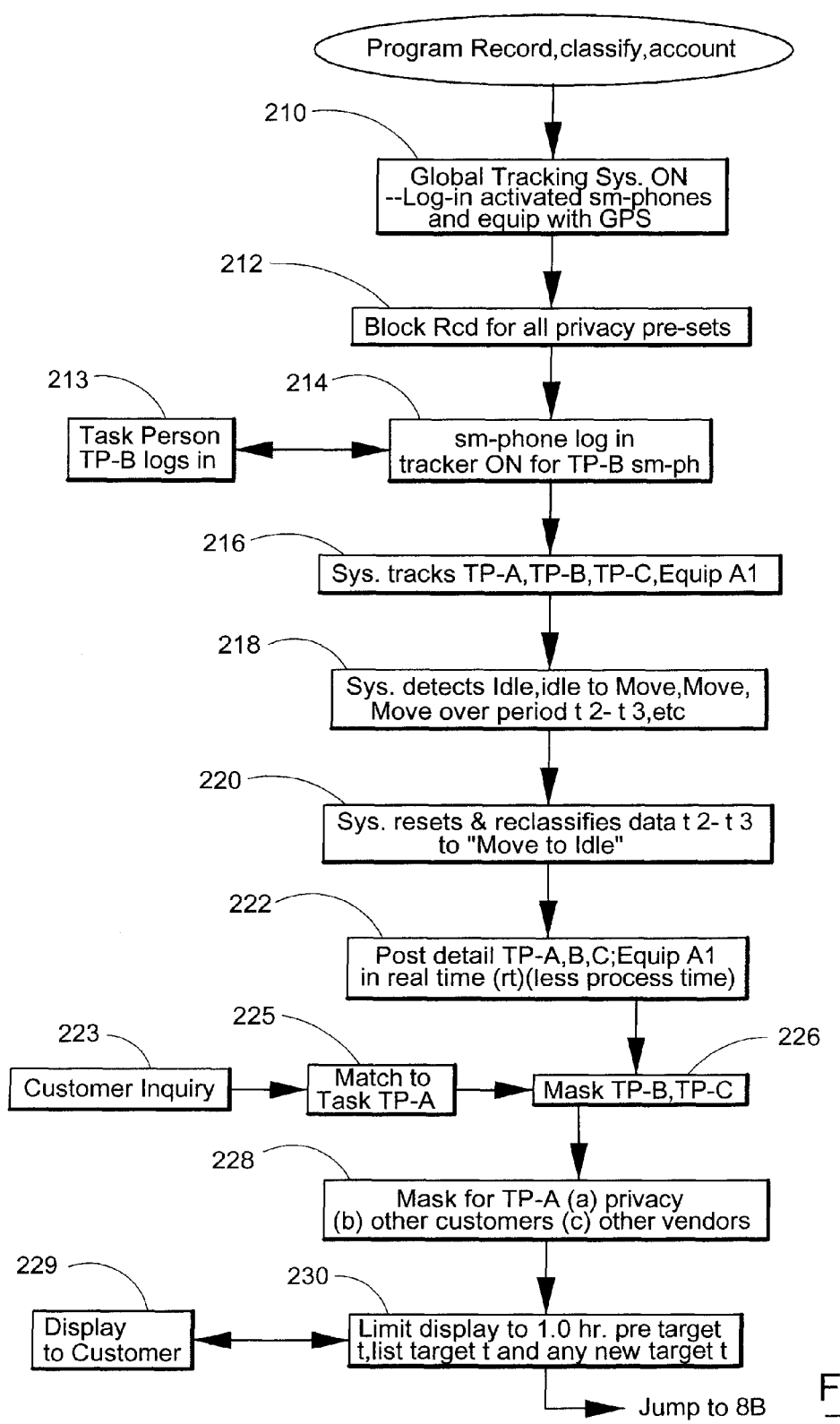
FIGS. 8A and 8B diagrammatically illustrate a process for recording, classsifying and accounting for time and travel and geographic location of task persons, GPS-enabled personnel and equipment.
Figure 8B:
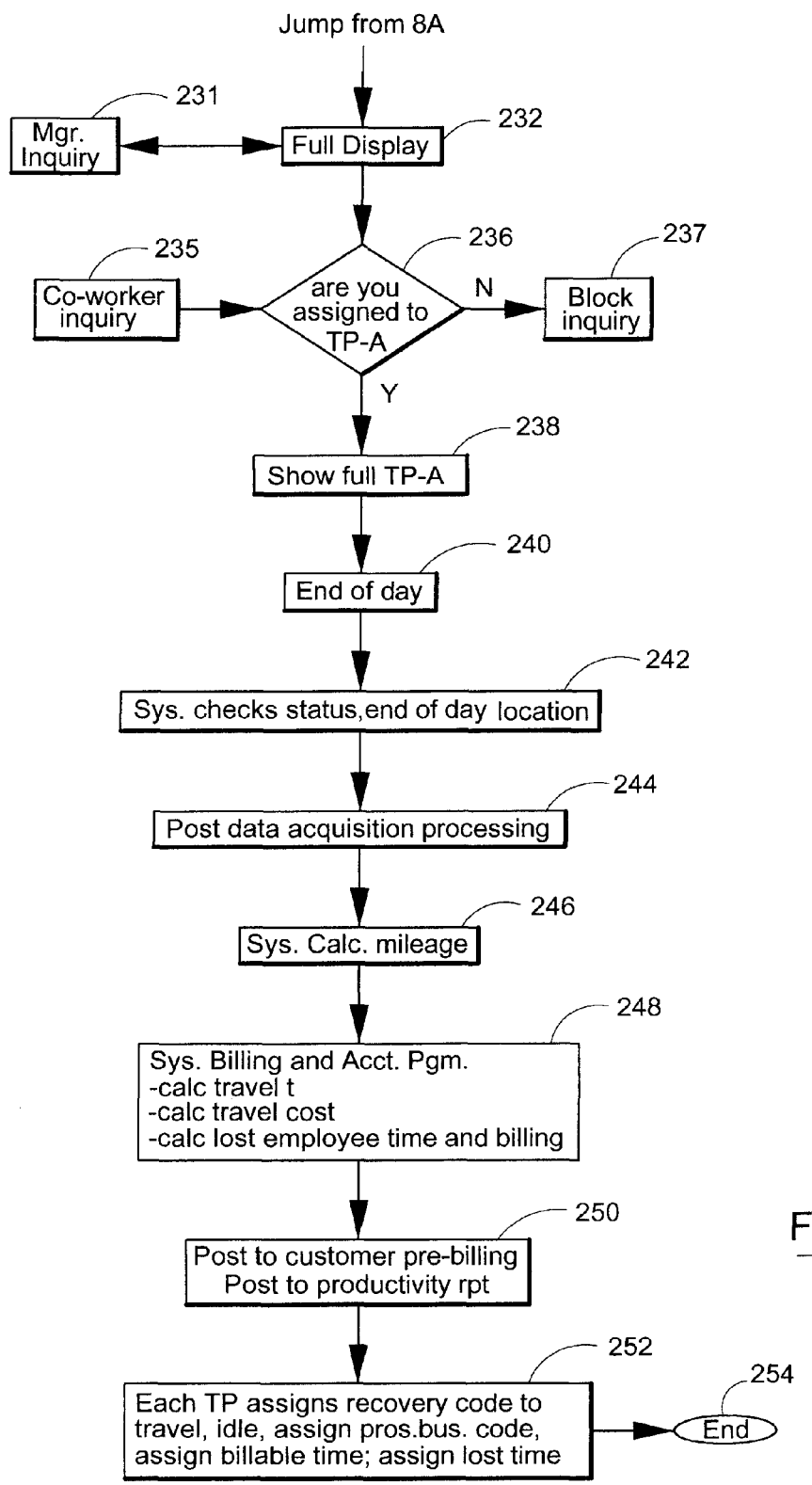

FIGS. 8A and 8B diagrammatically illustrate the process flowchart for the record, classify and account program. In step 210, the global tracking system is turn ON. Some GPS enabled devices will automatically login to the system. Other GPS devices will be logged into the system by task persons and managers selecting applications on their cell phones. Step 210 logs in the activated smart phones and equipment carrying GPS units. Step 212 blocks any records for all privacy block preset. As discussed earlier, the system enables the task person and/or the manager to set privacy pre-blocks which mask the geo location of the person carrying the GPS enabled device. In step 213, task person TP-B logs into the system. In step 214 the smart phone login is noted by the system and the tracker is turn ON for the TP-B smart phone. In step 216, the system tracks the GPS enabled devices carried by TP-A, TP-B, TP-C and equipment A1. In step 218, the system detects the idle, idle to move, move, and move to idle over period t2 through t3 as well as the idle. These items are discussed earlier. In step 220, the system resets and reclassifies data in time frame t2 through t3 the move to idle condition. In other words, the system can detect with reasonable accuracy an idle condition and can detect with reasonable accuracy a movement condition. However, in certain situations, for example in traffic jams, it is difficult to detect the exact time of the end of an idle condition and the beginning of a true movement condition. Therefore, in step 220, the system reclassifies the "type" or status data for time period t2 through t3.

In step 222, the system posts or publishes the detail of TP-A, B, C and each equipment A1. This is done in substantially real time (rt), taking into account the data process time and the reclassification time discussed above in step 220.

In step 223, a customer of the system operator (or user of the system) makes a request. In step 225, the customer's inquiry is matched to a particular task which is assigned to TP-A. In step 226, the system masks the daily time and movement status of persons TP-B and TP-C. In step 228, the system also masks for person TP-A any privacy block times as well as any time at customers other than the requesting customer. Other vendor data is also blocked for the customer inquiry. In step 230, the system publishes or displays, to the inquiring party a predetermined time frame prior to the projected time of arrival data. Masked or blocked data is not published. In FIG. 8A, this projected time of arrival data is called a "target time." The earlier published time frame is the "pre-target time." In other words, the system displays or publishes a one hour window prior to the target or scheduled time of arrival on site as well as any new target time. In step 229, the system web site displays this partly redacted display to the customer. In this manner, the customer is provided with relatively accurate on time data and the display notes any delays caused by traffic or other issues. The flowchart then jumps to 8B.

FIG. 8B shows in step 232 that a manager has made an inquiry in step 231. The system provides a full display of the real time move idle and status record to the manager. In step 236, a decision block responds to a co-worker inquiry in step 235. The system determines if the co-worker is assigned to or otherwise associated with person TP-A. If not, the NO branch is taken and the system blocks the inquiry in step 237. If the co-worker is associated with person TP-A (possibly as an assigned co-worker for task A-1) or a relative or a supervisor of person TP-A, the YES branch leads to step 238 which shows the full daily time and location and travel schedule for TP-A to the inquiring party. In step 240, an end of day indicator is noted. In step 242, the system checks the status and the end of day location for all GPS enabled equipment. For example, if a task person is generally in the office, the GPS signal may show movement away from the office location. With respect to equipment, that equipment if assigned to the operator's yard, the GPS location would match that geo location for the yard.

In step 224, the system notes that certain processing steps occur after the data acquisition. In step 248, the system calculates the mileage of each person and the equipment. The mileage could be calculated based on a time-based factor multiplied by a number resulting in a monetary value. Alternatively, the geo locations to the customer can be associated with a predetermined geo location such as the geo location of the office. In that manner, a distance-based monetary value is calculated for that unique task data collection. In step 248, the system engages a billing and accounting program. This billing and accounting program calculates the travel time and a monetary value for the travel time, calculates the travel cost, and calculates lost employee time. The billing records and prospective bills are updated and prepared. In step 250, this cost accounting monetized information is posted to a customer pre bill. These are also posted to productivity reports. In 252, each task person assigned to a project may assigned a recovery code to the travel, idle time, prospective business activity and assigned billable time and assigned loss time. In this manner, the managers receive feed back from the task person prior to finalizing the bills being sent to the client. The system ends in step 254.

Figure 9:
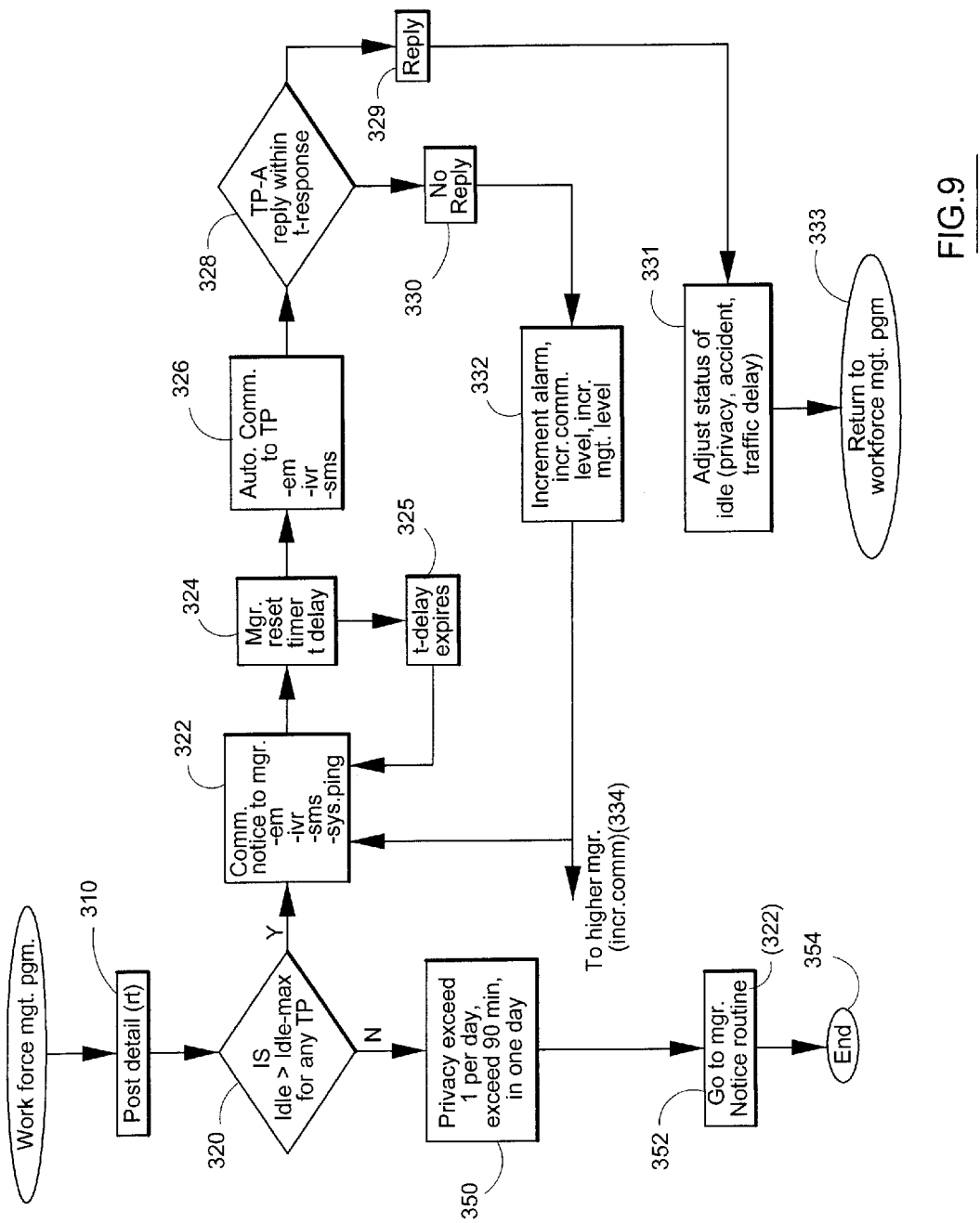
FIG. 9 diagrammatically illustrates a workforce management program for communications sessions, re-classification and confirm/approve/deny approval of events.

In FIG. 9, a work force management program is shown. In step 310, the information is posted in the daily time format in real time. In decision step 320 the system makes the determination about a particular idle time. When idle ON status indicator is active, and the time exceeds a predetermined value, identified as idle-max, certain system events are activated. The idle-max may be unique to a particular task person or may be generally assigned by the system operator. If NO, the system executes step 350 to determine whether a privacy time limit has been exceeded. For example, the system may be preset such that lunch periods for each task person should not exceed one hour. If the idle status ON is active for more than one hour and the task person has either, in real time, activated the privacy block ON or has preset the privacy block (present before the beginning of the day), the system may generate a communication session. The privacy time has exceeded a pre-set limit. In step 350, the system calculates the total amount of privacy block time accrued by a particular person that day. A predetermined threshold such as 90 minutes may be utilized by the system to determine that any and all privacy blocks for that person do not exceed 90 minutes in any one day. If YES, the system triggers management step 352 which is a communications notice routine. The process ends in step 354.

Returning to decision step 320, if the idle time exceeds idle-max or if the manager notice step 352 is activated ON, the YES branch is taken to step 322.

In step 322, a communication session is engaged with the manager. This communication session may start with a small, non intrusive communication event with the manager such as a text (SMS) message or an email. The communications may escalate to include a voice communication with an interactive voice response or IVR. Further, rather than start with an email and then progress to IVR, the system may begin with a text message or sms communication. The highest level of communications may include a system ping turning ON an audio and a visual indicator on the manager's laptop, computer desk or cell phone. The system is flexible enough such that the system operator can adjust the progression and sequence of the communication sessions and the aggressiveness of those communications sessions. In step 324, the manager can reset the time to investigate a potential improper idle or movement status. In step 325, the time delay has expired and the system returns to initiate communication session with manager in step 322. If the manager does not reset the timer in step 324, in step 326, the system automatically communicates with the task person TP. This communication also may be set to progress from a nominal communication up to very aggressive "telephone call" event. A text message or sms may first be sent to the task person. Then an email may be sent to the task person. Finally the task person may be called by the system through an ivr portal. In step 328, the system determines whether the task person TP-A has replied within a certain response time. If YES, the system executes reply block 328 and in step 331 the system adjusts the status of the comm indicator. For example, if the idle ON status indicator is active, the task person may reset it for a privacy block. Potentially, the task person forgot that he or she was going to lunch and should have activated the privacy block. Otherwise, the task person may indicate that an accident during transit occurred or that the idle delay is subject to a traffic delay. In step 333, the system returns to the work force manager program.

Returning to decision block 328, if no reply is noted by the system in step 330, in step 332 the system increments the alarm, increments the communication session with the task person and increments communications with the manager, and potentially increments the management level. For example, a supervisor may first be notified and then, if the incident is not corrected or altered, the plant manager or site manager may be notified as noted in step 334.

As discussed above, the system is highly flexible for various tasks and privacy blocks.

The following Tables A-E provide additional information and processes which show the high degree of flexible that the system operator and user of the system can employ. The information in Tables A-E are provided as examples only and these Tables may be mixed and matched depending upon the flexibility of the worker and management style.

TABLE A

Real Time Reset "Type" for Privacy Time Block

1. Identify general comm clearance time-based rules for Privacy, for example ("e.g.") "comm set ON" 9 AM to 11:30 AM and 1:30 PM to 5 PM
2. Identify general comm rules length of Privacy within key work periods (9 AM to 11:30 AM and 1:30 PM to 5 PM), e.g., comm clearance when Privacy ON for more than 30 min.
3. $1^{st}$ comm notice: to Task Person A: sms: "Please confirm Privacy Blocker ON"
4. Sys. await response from Task Person A. Wait time is 5 min.
5. If no response, 2nd comm notice of TP-A: sms and IVR: "$2^{nd}$ Notice: Please confirm Privacy Blocker ON".
5a. Sys. await response from Task Person A. Wait time is 5 min.
5b. $1^{st}$ Mgr. comm notice: to Mgr of Task Person A: sms: "Confirm TP-A Privacy Blocker ON. Sys seeks approval/non-approval."
5c. Sys. await response from Mgr. for Task Person A. Wait time is 5 min.
5d. Escalate comm. to TP-A and to Mgr. for TP-A: e.g., $1^{st}$ sms, $2^{nd}$ IVR, $3^{rd}$ email, $4^{th}$ comm to next level higher Mgr.
6. If TP-A response submitted to Step 5: (i) set privacy block ON for either 30 min (or other pre-set time block) or (ii) set privacy block ON for period suggested by TP-A.
7. Reset the "Type" label on the time block to "privacy." Display re-set "Type" on the sys daily calendar.
8. Increment total "Daily Privacy Timer" for TP-A.
9. Execute Workforce Management Program as needed With respect to Table A, this process flow shows that a task person can reset any particular status condition for a privacy time block. In Table A, step 1, the system has preset rules which indicates that a privacy can only be activated during communications set ON during key business hours and all privacy requests need confirmation by management. The confirmation is enabled by "comm set ON" noting that managers are involved in the communications sessions. The "comm set ON" in the Tables refer to a system ON activation of the message and communications routine generally shown in FIG. 9. A "comm OFF" turns OFF the managerial "confirmation required" pathways. In Table A, when the comm is set OFF (outside or beyond the key work periods), no managerial approval is needed. During these key work periods, a manager's approval is needed for a privacy block. In other words, if a worker wants to set a privacy block at anytime between 11:30 AM and 1:30 PM, there is no need for the system to contact the manager or otherwise (no comm necessary). In Table A, step 2, there are general communications rules regarding the length of any privacy block within the key work periods. Those key work periods are 9 AM to 11:30 AM and 1:30 PM to 5 PM. For example, the system can be preprogrammed such that the manager or supervisor must clear a privacy ON block for anything greater than 30 minutes within that key work period. In non-key work periods, the general comm rules may permit the task person to block 90 minutes of privacy. In Table A, steps 3, 4, 5 and 5a relate an increasing progression of communications session with the task person based upon excessive idle status ON. In step 5b, managers are given a communications notice as well as a reminder to task person A. In step 5b, the system seeks approval of the privacy block from the manager. Steps 5d, 6, 7, 8 and 9 discuss escalating the communications and resetting the privacy block and incrementing the daily privacy timer for task person TP-A.

TABLE B

Real Time Reset "Type" for Idle Time Block - TP Office Worker

| | |
|---|---|
| 1. | Identify general comm clearance time-based rules for Idle, e.g., "comm set IDLE ON - Office Location" during key periods 9 AM to 11:30 AM and 1:30 PM to 5 PM |
| 2. | Identify general comm rules as a geo-location range for IDLE-ON-OFFICE within key work periods (9 AM to 11:30 AM and 1:30 PM to 5 PM), e.g., comm clearance when geo-location for IDLE-ON-OFFICE exceeds detected geo-location for more than 10 min. |
| 3. | $1^{st}$ comm notice: to Task Person A: sms: "Please confirm In-Office Status." |
| 4. | Sys. await response from Task Person A. Wait time is 5 min. |
| 5. | If no response, $2^{nd}$ comm notice of TP-A: sms and IVR: "$2^{nd}$ Notice: Please confirm In-Office Status." |
| 5a. | Sys. await response from Task Person A. Wait time is 5 min. |
| 5b. | $1^{st}$ Mgr. comm notice: to Mgr of Task Person A: sms: "Confirm TP-A In-Office Status. Sys seeks approval/non-approval." |
| 5c. | $1^{st}$ Receptionist call comm notice: to Office Receptionist of Task Person A: sms: "Confirm TP-A In-Office Status. Sys seeks confirmation." |
| 5d. | Sys. await response from Mgr. for Task Person A. Wait time is 5 min. |
| 5e. | Sys. await response from Receptionist for Task Person A. Wait time is 5 min. |
| 5f. | Escalate comm. to TP-A and to Mgr. and Receptionist for TP-A: e.g., $1^{st}$ sms, $2^{nd}$ IVR, $3^{rd}$ email, $4^{th}$ comm to next level higher Mgr. |
| 6. | If TP-A response submitted to Step 5: (i) set privacy block ON for either 30 min (or other pre-set time block) or (ii) set "Out of Office" Type ON for period reported by TP-A or (iii) set status to "ON Task AA" or status to "ON Vendor Task" or status to "ON Prospective Customer." |
| 7. | Reset the "Type" label on the time block. Display re-set "Type" on the sys daily calendar. |
| 8. | Execute Workforce Management Program as needed |

Table B discusses the situation when the task person generally works in the office. In this situation, the system can be preprogrammed such that if the office worker is not in the office, a status event is triggered depending upon the geo location of the GPS unit carried by the office worker compared with the geo location of the office. Communications are sent to the task person and then to the receptionist (to page the office worker) and then to the manager. Further, the geo location range for "idle ON office" is pre-set for certain time brackets. Therefore, time-based rules are applied and geo location rules are independently applied. See Table B, step 2.

TABLE C

Real Time Reset "Type" for Idle Time Block - TP Traveler

| | |
|---|---|
| 1. | Identify general comm clearance time-based rules for Task Geo-Loc, e.g., "comm set IDLE ON - Task Loc TP-A1" 30 min prior to scheduled appointment plus estimated "time at Loc TP-A1" plus 30 min post. |
| 2. | Identify general comm rules geo-location range for IDLE-Task Loc TP-A1 within key task period (the scheduled task time), e.g., comm clearance when geo-location for IDLE-Task Loc TP-A1 exceeds detected geo-location for more than 10 min. |
| 2alt. | Identify general comm rules geo-location range for IDLE-Task Loc TP-A1 within key task period (the scheduled task time), e.g., comm clearance when geo-location for IDLE-Task Loc TP-A1 exceeds detected geo-location over a spatial predetermined geo-range, e.g., when the TP-A geo-loc exceeds IDLE-Task Loc TP-A1 by more than 500 feet. |

TABLE C-continued

Real Time Reset "Type" for Idle Time Block - TP Traveler

| | |
|---|---|
| 3. | $1^{st}$ comm notice: to Task Person A: sms: "Please confirm Task Loc TP-A1 Status." |
| 4. | Sys. await response from Task Person A. Wait time is 5 min. |
| 5. | If no response, $2^{nd}$ comm notice of TP-A: sms and IVR: "$2^{nd}$ Notice: Please confirm Task Loc TP-A1 Status." |
| 5a. | Sys. await response from Task Person A. Wait time is 5 min. |
| 5b. | $1^{st}$ Mgr. comm notice: to Mgr of Task Person A: sms: "Confirm TP-A at Task Loc TP-A1 Status. Sys seeks approval/non-approval." |
| 5c. | Sys. await response from Mgr. for Task Person A. Wait time is 5 min. |
| 5d. | Escalate comm. to TP-A and to Mgr.: e.g., $1^{st}$ sms, $2^{nd}$ IVR, $3^{rd}$ email, $4^{th}$ comm to next level higher Mgr. |
| 5e. | Sys. check geo-loc of all equipment assigned to TP-A. This Step 5e may be executed earlier, such as with Steps 1, 2, 2alt., 3, etc. |
| 6. | If TP-A response supplied in Step 5: (i) set privacy block ON for either 15 min (or other pre-set time block) or (ii) set "Traffic Delay" Type ON for Non-Idle (Movement) period reported by TP-A or (iii) free-style post sms or IVR converted to text data on TP-A daily calendar |
| 7. | Reset TP-A Task TP-A1 to new scheduled time. Notify customer. |
| 8. | Reset the "Type" label on the time block as needed. Display re-set "Type" on the sys daily calendar. |
| 9. | Execute Workforce Management Program as needed. |

With respect to resetting the type or idle ON status indicator or movement ON status indicator for a traveling task person, Table C provides some functional steps for the system. In Table C, step 1, the system "looks for" the traveling task person 30 minutes prior to geo location of the task A1 as well as 30 minutes after the scheduled time for task at location A1. This is a time-based or temporal rule process. Step 2 applies communication rules to the geographic location range (within 30 miles of task location A01) within the certain key task period (1 hour prior to scheduled time). This is a spatial rule process. If the geo location for the traveling task person exceeds a detected geo location range close to the Task situs for more than 10 minutes, communication rules are applied to communicate with the traveling person. The rules may involve a spatial or distance relationship to the target task location A1. Also the rules may integrate time based rules into the spatial rules and comm session format. In steps 3 to 5d, escalating communications are enabled with the task person and the manager. In step 5e, the system checks the geo location of all equipment assigned to task person TP-A. Of course, step 5e could be conducted earlier in the program. In step 7, the scheduled time for the task is reset and a notification is sent to the customer. This is discussed in the incorporated pending patent application.

TABLE D

Calendar Display

| | |
|---|---|
| 1. | Initial Calendar Display lists proposed travel time (as Movement), Privacy Blocks (e.g., for lunch), and Time-On-Task-Site (listing a scheduled time to arrive on TP-A1 site, and an estimated "time to complete task TP-A1" (sometimes called "Time on Task"). |
| 2. | Day progresses, Sys gathers geo-loc data for geo-enabled TP-A devices and Equipment |
| 3. | TP-A communicates with sys and updates status or type of event, e.g. in traffic, delayed, in privacy block, at vendor-supplier, at customer, in office |
| 4. | In the event the current status-type exceeds a time parameter or a geo-loc parameter, a comm session is initiated with the actor (TP-A), first seeking an update, then escalating into |

TABLE D-continued

Calendar Display comm sessions with other personnel and activating more
   intrusive comm sessions with the actor.
5. When the actor (TP-A) provides an update to status-type, the
   Daily calendar is supplemented, altered or otherwise annotated
   for the new status-type.

Table D relates to the calendar or daily display. In step 1, the initial calendar display lists the proposed travel time as potential movement and lists privacy blocks and time on task site for a particular schedule. This is a typical "scheduling" calendar. In step 2, as the day progresses the online daily calendar is populated with task and travel related data as the system gathers geo location data from geo enabled devices and updates the daily display. The system communicates with the task person and the task person updates the status of the events whether in traffic, delayed, an accident, or under privacy block, at a vendor supplier, at a customer's location, at a prospective customer location, or in the office. In step 4, if the event status exceeds a status type time parameter (a temporal rule) or a geo location distance parameter (a spatial rule), a communications session is initiated with the actor, such as the task person, first seeking an update form the task person and then escalating into communication sessions with other personnel such as managers or co-workers. When the actor or the task person provides an update of the status report, the daily calendar is supplemented, altered or otherwise annotated.

TABLE E

Event - Type Indicator Table traffic delay indicator
   vendor assistance indicator
   equipment needed indicator
   co-worker needed indicator Table E is an event type indicator table. The various indicators could show a traffic delay, an accident, a vendor assistance indicator. This "vendor assistance indicator" may be a task person noting that he or she needs to go to a store to buy supplies or other equipment for a particular task. The task person may also identify "equipment needed" for a particular task and the need to go rent that equipment from a vendor or return to the office for the designated equipment. In certain situations, the task person may require an additional co-worker. All these status type indicators may be integrated into the system.

Accordingly, the system initially provides daily calendar with privacy blocks that may be pre-assigned by management or by the task person. As the day progresses, GPS signals locate the person and determine whether the idle ON status is active or whether the movement ON status is active. When geo locations match customer locations, an indication of task person on site is provided. To account for unexpected delays, communications are established between the task person and the system to identify traffic delays, to provide the task person a real time privacy event, to identify vendor assistance or equipment needed or co-worker needed. These status reports are provisionally classified and potentially published in the time segmented delay. Managerial confirmation may be required for these various events. Further, the system is flexible enough such that the customer is given some information but not all the information. Managerial confirmation is typically required before customer information is released to the customer. All of these events require an end of status time and the system calculates the corresponding duration. In addition, a respective accounting recovery code is assigned to the recorded event and duration. This enables a time-based monetary value to be assigned. Therefore, travel time can be recouped or potentially billed as well as either on a time base monetary value or on a geographic base monetary value.

Description of Typical System Features

The present invention relates to an enhanced mobile workforce planner and tracker deployed over GPS-enabled devices and enabling access to workforce data via computer systems, over the Internet and on a computer network (LAN or WAN), and computer programs, computer modules and information processing systems to accomplish these planning and tracking services.

It is important to know that the embodiments illustrated herein and described herein below are only examples of the many advantageous uses of the innovative teachings set forth herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality. In the drawings, like numerals refer to like parts or features throughout the several views.

The present invention could be produced in hardware or software, or in a combination of hardware and software, and these implementations would be known to one of ordinary skill in the art. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in the art.

According to the inventive principles as disclosed in connection with the preferred embodiments, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer as would be known to one of ordinary skill in the art. The computer medium which may be used to hold or contain the computer program product, may be a fixture of the computer such as an embedded memory or may be on a transportable medium such as a disk, as would be known to one of ordinary skill in the art. Further, the program, or components or modules thereof, may be downloaded from the Internet of otherwise through a computer network.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, flash memory, floppy disk, disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network, that allow a computer to read such computer readable information.

In the drawings, and sometimes in the specification, reference is made to certain abbreviations. The following Abbreviations Table provides a correspondence between the abbreviations and the item or feature.

Abbreviations Table

| | |
|---|---|
| acct | accounting, typically an accounting function |
| Admin | Administrator |
| API | application program interface |
| ASP | application service provider - server on a network |
| bd | board |
| bus | business |
| calc | calculate |
| cell ph | cell phone with GPS enablement |
| comm. | communications, typically telecom function, line or event |
| comp | computer with Internet access |
| comp-tbl | computer tablet with GPS and telecom link |
| CPU | central processing unit |
| db | data base, may also refer to a spreadsheet (a two-dimensional database) |
| Disp | display or code |
| doc | document |
| dr | drive, e.g., computer hard drive |
| em | email communicaiton |
| Equip | equipment |
| fnc | function such as V = View, ACC = Accept task; DEl = delete entry; ACK = acknowledge receipt of comm. |
| Geo | geographic location or data (geo.loc. is GPS data) |
| GPS | geo positioning system and location (optionally time data) |
| HR | human resources or regional manager |
| I/O | input/output |
| Int | Internet network (part of the telecom network) |
| ivr | interactive voice response, includes voice message only cell ph |
| loc | location |
| loc. ptr. | displayed location on a displayed map |
| mem | memory |
| Mess | message as in SMS or text message |
| mgr. | manager, maybe mgr in Sys Op administration or TP workforce |
| mgt | management |
| ntwk | network |
| pend | pending, such as a posted task, not yet completed |
| pgm | program |
| proc | processor, as in computer processor |
| pros | prospective, as is prospective business or customer |
| pros bus | prospective business event |
| Pty | party, as in Trusted 3$^{rd}$ Party ("TTP") |
| P/W | password |
| Rcd | database record or record profile |
| re | regarding or relating to |
| Reg'd | registered as in Reg'd Pro, Registered Provider |
| rel | release |
| req | request |
| rev | review |
| Rpt | Report |

Abbreviations Table -continued

| | |
|---|---|
| rt | real time, may include day and time stamp data |
| sec | security |
| Sel | select |
| sm-ph | smart cellphone with GPS |
| sms | short message service or text message |
| SR | sales representative |
| sys | system |
| sys ping | a notification, audio, visual or comm event to a TP or mgr. |
| Sys Op | System Operator |
| t | time, sometimes refers to day and date and time of day |
| T-person | task person who is assigned a task |
| TP-A | task person A, Task person B (TP-B) |
| Tbl | table, may be configured as a database or spreadsheet |
| telecom | telecommunications system or network |
| URL | Uniform Resource Locator, or other network locator |
| u-sel | User selects function |
| WO | work order |
| X-tbl | a selectable user function displayed beyond the grid line of the data table |

The claims appended hereto are meant to cover modifications and changes within the scope and spirit of the present invention.

What is claimed is:

1. A computer-based method to convert GPS signal data from a GPS-enabled cellular phone, tablet computer or electronic device into motion indicator data and idle indicator data which motion and idle data is classified as a task-related event or a privacy event, the method operative with a database populated with a plurality of tasks represented by unique task data collections and task person data, each one of said unique task data collections having task situs location data, projected time of arrival data, time-on-site data, and task assignment data, said task person data representing at least contact data for that task person, said database coupled to a web-based processor which in turn is coupled to a telecommunications network, said GPS-enabled device coupled to said telecommunications network, the method comprising:
   periodically gathering GPS time stamped location data from said GPS-enabled device adapted to be used by said task person assigned to said unique task via a web-based communications channel between said web-based processor and said GPS-enabled device;
   determining when said GPS-enabled device is in an idle mode defined by a territory about a present GPS location data by monitoring a distance between at least one earlier position of said GPS-enabled device and the present GPS location data and generating an idle ON status indicator when a distance threshold is not exceeded;
   determining when said GPS-enabled device moves by comparing at least one earlier position of said GPS-enabled device and the present GPS location data to one of said distance threshold, a velocity threshold and a change in velocity threshold and generating a movement ON status indicator;
   determining when said GPS-enabled device is in the idle mode and the present GPS location data matches said task situs location and generating time-on-site data, the time-on-site data including a start time, a duration and an end-of-task time, the end-of-task time determined, when the idle ON status indicator changes and the movement ON status indicator is generated;

gathering privacy event data from said task person either prior to the step of periodically gathering GPS time stamped location data or prior to the step of determining the idle mode and generating the idle ON status indicator, said privacy event data including at least a privacy start time;

classifying, in substantially real time, a privacy block over the idle ON status indicator and the movement ON status indicator when privacy event data is compiled;

accepting an end-of-privacy time from the assigned task person as part of said privacy event data;

classifying, in substantially real time, idle indicator data when the idle ON status indicator is present and publishing the idle indicator data for the assigned task person upon command beyond the privacy block;

classifying, in substantially real time, motion indicator data when the movement ON status indicator is present and publishing the motion indicator data for the assigned task person upon command beyond the privacy block;

accepting a privacy block re-classification request from the assigned task person after the classification of either of the idle indicator data and motion indicator data and reclassifying one or both of the idle indicator data and the motion indicator data in the privacy block;

determining when said GPS-enabled device is in the idle mode and the present GPS location data does not match said task situs location; and initiating a communications session with the task person assigned to the unique task, and accepting either task related event data or privacy data from the task person during the communications session including:
a traffic delay indicator;
a real time privacy event data;
a vendor assistance indicator;
an equipment needed indicator; and
a co-worker needed indicator.

2. The method as claimed in claim 1 including accepting a managerial confirmation prior to reclassifying one or both of the idle indicator data and the motion indicator data in the privacy block corresponding to the privacy block re-classification request.

3. The method as claimed in claim 1 including provisionally classifying and publishing, upon command, the
traffic delay indicator;
real time privacy event data;
vendor assistance indicator;
equipment needed indicator;
co-worker needed indicator;
in a time-segmented display in addition to projected time of arrival data for the unique task.

4. The method as claimed in claim 3 including accepting a managerial confirmation of said
traffic delay indicator;
real time privacy event data;
vendor assistance indicator;
equipment needed indicator;
co-worker needed indicator;
prior to publishing, upon command, the time-segment display.

5. The method as claimed in claim 4 including:
determining an end-of-status time and the corresponding duration of:
traffic delay indicator;
vendor assistance indicator;
equipment needed indicator;
co-worker needed indicator;
when the idle ON status indicator changes and the movement ON status indicator is generated.

6. The method as claimed in claim 5 including: associating a respective accounting recovery code to:
traffic delay indicator;
vendor assistance indicator;
equipment needed indicator;
co-worker needed indicator;
time-on-site duration; and
generating a time-based monetary value far these indicator time durations.

7. The method as claimed in claim 6 including: determining a travel time to said task situs from a predetermined location and associating an additional respective accounting recovery code for said travel time for said unique task and generating either a time-based monetary value for the travel time or a geographic-based monetary value for the travel time.

8. A computer-based method to convert GPS signal data from a GPS-enabled cellular phone, tablet computer or electronic device into motion indicator data and idle indicator data which motion and idle data is classified as a task-related event or a privacy event, the method operative with a database populated with a plurality of tasks represented by unique task data collections and task person data, each one of said unique task data collections having task situs location data, projected time of arrival data, time-on-site data, and task assignment data, said task persom data representing at least contact data for that task person, said database coupled to a web-based processor which in turn is coupled to a telecommunications network, said GPS-enabled device coupled to said telecommunications network, the method comprising:

periodically gathering GPS time stamped location data from said GPS-enabled device adapted to be used by said task person assigned to said unique task via a web-based communications channel between said web-based processor and said GPS-enabled device;

determining when said GPS-enabled device is in an idle mode defined by a territory about a resent GPS location data by monitoring a distance between at least one earlier position of said GPS-enabled device and the present GPS location data and generating an idle ON status indicator when a distance threshold is not exceeded;

determining when said GPS-enabled device moves by comparing at least one earlier position of said GPS-enabled device and the present GPS location data to one of said distance threshold, a velocity threshold and a change in velocity threshold and generating a movement ON status indicator;

determining when said GPS-enabled device is in the idle mode and the present GPS location data matches said task situs location and generating time-on-site data, the time-on-site data including a start time, a duration and an end-of-task time, the end-of-task time determined when the idle ON status indicator changes and the movement ON status indicator is generated;

gathering privacy event data from said task person either prior to the step of periodically gathering GPS time stamped location data or prior to the step of determining the idle mode and generating the idle ON status indicator, said privacy event data including at least privacy start time;

classifying, in substantially real time, a privacy block over the idle ON status indicator and the movement ON status indicator when privacy event data is compiled:

accepting an end-of-privacy time from the assigned task person as part of said privacy event data;

classifying, in substantially real time, idle indicator data when the idle ON status indicator is present and publishing the idle indicator data for the assigned task person upon command beyond the privacy block;

classifying, in substantially real time, motion indicator data when the movement ON status indicator is present and publishing the motion indicator data for the assigned task person upon command beyond the privacy block;

accepting a privacy block re-classification request from the assigned task person after the classification of either of the idle indicator data and motion indicator data and reclassifying one or both of the idle indicator data and the motion indicator data in the privacy block;

wherein the step of gathering privacy event data from said task person includes both:

(a) prior to the step of periodically gathering GPS time stamped location data, gathering both said privacy-start-time and end-of-privacy time as said privacy event data from said task person; and (b) accepting, in substantially real time, the privacy-start-time from the task person; and, wherein the step of accepting the end-of-privacy time is either a substantially real time communication from the assigned task person or is determined when the idle status ON indicator changes and the movement ON status indicator is generated.

* * * * *